United States Patent
Armstrong et al.

(10) Patent No.: US 8,010,763 B2
(45) Date of Patent: Aug. 30, 2011

(54) HYPERVISOR-ENFORCED ISOLATION OF ENTITIES WITHIN A SINGLE LOGICAL PARTITION'S VIRTUAL ADDRESS SPACE

(75) Inventors: William J. Armstrong, Rochester, MN (US); Orran Y. Krieger, Newton, MA (US); Cathy May, Millwood, NY (US); Michal Ostrowski, Austin, TX (US); Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 12/111,041

(22) Filed: Apr. 28, 2008

(65) Prior Publication Data
US 2009/0037682 A1    Feb. 5, 2009

Related U.S. Application Data

(60) Provisional application No. 60/953,512, filed on Aug. 2, 2007.

(51) Int. Cl.
- G06F 12/00 (2006.01)
- G06F 13/00 (2006.01)
- G06F 13/28 (2006.01)
- G06F 9/455 (2006.01)

(52) U.S. Cl. ............. 711/164; 711/153; 711/154; 718/1

(58) Field of Classification Search .......... 711/163–164, 711/152–153; 718/1
See application file for complete search history.

(56) References Cited

U.S. PATENT DOCUMENTS

| | | | |
|---|---|---|---|
| 5,432,929 A | 7/1995 | Escola et al. | |
| 5,555,385 A | 9/1996 | Osisek | |
| 6,970,990 B2 | 11/2005 | Rogers et al. | |
| 7,296,133 B2 | 11/2007 | Swanberg | |
| 2006/0047959 A1 | 3/2006 | Morais | |

(Continued)

FOREIGN PATENT DOCUMENTS

EP    1548589 A2    6/2005

(Continued)

OTHER PUBLICATIONS

"Single Root I/O Virtualization and Sharing Specification—Revision 1.0", PCI-SIG (Sep. 11, 2007).

(Continued)

Primary Examiner — Kevin L Ellis
Assistant Examiner — Ryan Bertram
(74) Attorney, Agent, or Firm — Heslin, Rothenberg, Farley & Mesiti, PC

(57) ABSTRACT

Access control to shared virtual address space within a single logical partition is provided. The access control includes: associating, by a hypervisor of the data processing system, a memory protection key with a portion of a single logical partition's virtual address space being shared by multiple entities, the key preventing access by one of the multiple entities to that portion of the virtual address space, and allowing access by another of the entities to that portion of the virtual address space; and locking by the hypervisor the memory protection key from modification by the one entity, wherein the locking prevents the one entity from modifying the key and thereby gaining access to the portion of the single logical partition's virtual address space with the associated memory protection key. In one embodiment, the one entity is the single logical partition itself, and the another entity is a partition adjunct.

21 Claims, 27 Drawing Sheets

U.S. PATENT DOCUMENTS

| | | | |
|---|---|---|---|
| 2006/0064523 | A1 | 3/2006 | Moriki et al. |
| 2006/0095690 | A1 | 5/2006 | Craddock et al. |
| 2006/0143417 | A1* | 6/2006 | Poisner et al. ............... 711/164 |
| 2006/0195663 | A1 | 8/2006 | Arndt et al. |
| 2006/0209863 | A1 | 9/2006 | Arndt et al. |
| 2006/0250945 | A1 | 11/2006 | Fernandes et al. |
| 2006/0294288 | A1* | 12/2006 | Seth et al. ..................... 711/6 |
| 2007/0180210 | A1* | 8/2007 | Thibadeau .................... 711/163 |
| 2008/0016337 | A1* | 1/2008 | Morgan et al. ................. 713/158 |
| 2008/0091855 | A1 | 4/2008 | Moertl et al. |

FOREIGN PATENT DOCUMENTS

| | | |
|---|---|---|
| EP | 1691287 A1 | 8/2006 |

OTHER PUBLICATIONS

"Xen: Enterprise Grade Open Source Virtualization, Inside Xen 3.0—A XenSource White Paper", XenSource, Inc., (pp. 1-4) (Jun. 1, 2006).

* cited by examiner

HYPERVISOR-ENFORCED ISOLATION OF ENTITIES WITHIN A SINGLE LOGICAL PARTITION'S VIRTUAL ADDRESS SPACE

CROSS-REFERENCE TO RELATED APPLICATION

This application claims priority from U.S. Patent Provisional Application No. 60/953,512, filed Aug. 2, 2007, entitled "Partition Adjunct Environment", the entirety of which is hereby incorporated herein by reference.

TECHNICAL FIELD

The present invention relates generally to data processing systems, and more particularly, to control and isolation of entities sharing a single logical partition's virtual address space.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS), which provides input/output services to one or more other LPARs of the data processing system. This offloading of higher-level function avoids complex code in the hypervisor, and thus, assists in maintaining the hypervisor small and secure within the data processing system. Using logical partitions to provide such services to other logical partitions, however, requires relatively high overhead to instantiate and run the logical partition, and thus, a full operating system, in order to provide such services.

SUMMARY OF THE INVENTION

Disclosed herein, in one aspect, is a solution which allows services to be provided to a logical partition without requiring another full logical partition to provide the services, and without requiring embedding of the services in the initiating logical partition or in the hypervisor. A partition adjunct, such as described and claimed herein, is a new execution environment which provides this middle ground. New processor level features and procedures are also described herein and employed by the hypervisor to facilitate operation of the partition adjunct.

Provided herein, in one aspect, is a method of controlling access to shared virtual address space within a data processing system. The method includes: associating, by a hypervisor of the data processing system, a memory protection key with a portion of a single logical partition's virtual address space, the single logical partition's virtual address space being shared by multiple entities, the memory protection key preventing access by one entity of the multiple entities to the portion of the single logical partition's virtual address space, and allowing access by another entity of the multiple entities to the portion of the single logical partition's virtual address space; and locking by the hypervisor the memory protection key from modification by the one entity of the multiple entities sharing the single logical partition's virtual address space, and wherein the locking prevents the one entity from modifying the memory protection key and thereby gaining access to the portion of the single logical partition's virtual address space with the associated memory protection key.

In another aspect, a method of protecting memory employed by a partition adjunct is provided. This method includes: instantiating by a hypervisor a partition adjunct within a data processing system employing virtual address space donated to the partition adjunct by a logical partition of the data processing system, and wherein the instantiating includes associating a memory protection key with the donated virtual address space of the logical partition which allows access to the donated virtual address space by the partition adjunct and prevents access to the donated virtual address space by the logical partition; and locking by the hypervisor the memory protection key from being modified by the logical partition.

In yet another aspect, a data processing system is provided which comprises a hypervisor. The hypervisor associates a memory protection key with a portion of a single logical partition's virtual address space, wherein the single logical partition's virtual address space is shared by multiple entities. The memory protection key prevents access by one entity of the multiple entities to the portion of the single logical partition's virtual address space, and allows access by another entity of the multiple entities to that portion of the single logical partition's virtual address space. The data processing system further includes a locking mechanism set by the hypervisor to lock the memory protection key from modification by the one entity of the multiple entities sharing the single logical partition's virtual address space, wherein the locking prevents the one entity from modifying the memory protection key and thereby gain access to the portion of the single logical partition's virtual address space with the associated memory protection key.

In a further aspect, the invention comprises an article of manufacture which includes at least one computer-usable medium having computer-readable program code logic to define a method of controlling access to shared virtual address space within a data processing system. The computer-readable program code logic when executing on a processor performing: associating, by a hypervisor of the data processing system, a memory protection key with a portion of a single logical partition's virtual address space, the single logical partition's virtual address space being shared by multiple entities, and the memory protection key preventing access by one entity of the multiple entities to the portion of the single logical partition's virtual address space, and allowing access by another entity of the multiple entities to the portion of the single logical partition's virtual address space; and locking by the hypervisor the memory protection key from modification by the one entity of the multiple entities sharing the single logical partition's virtual address space, wherein the locking prevents the one entity from modifying the memory protection key and thereby gaining access to the portion of the single logical partition's virtual address space with the associated memory protection key.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
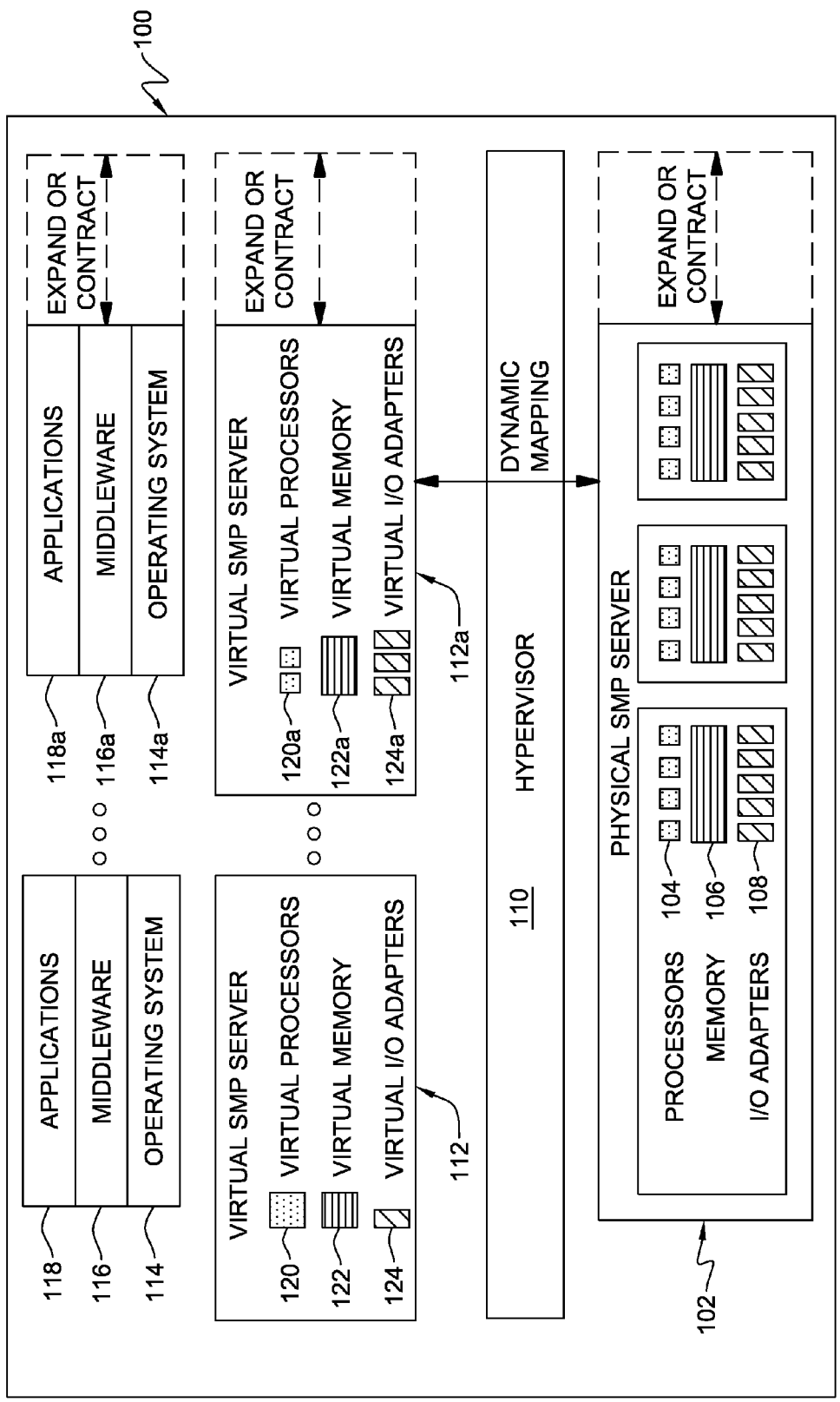
FIG. 1 is a block diagram of one embodiment of a data processing system to implement one or more aspects of the present invention.

FIG. 1 is a block diagram of a data processing system 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, manging, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
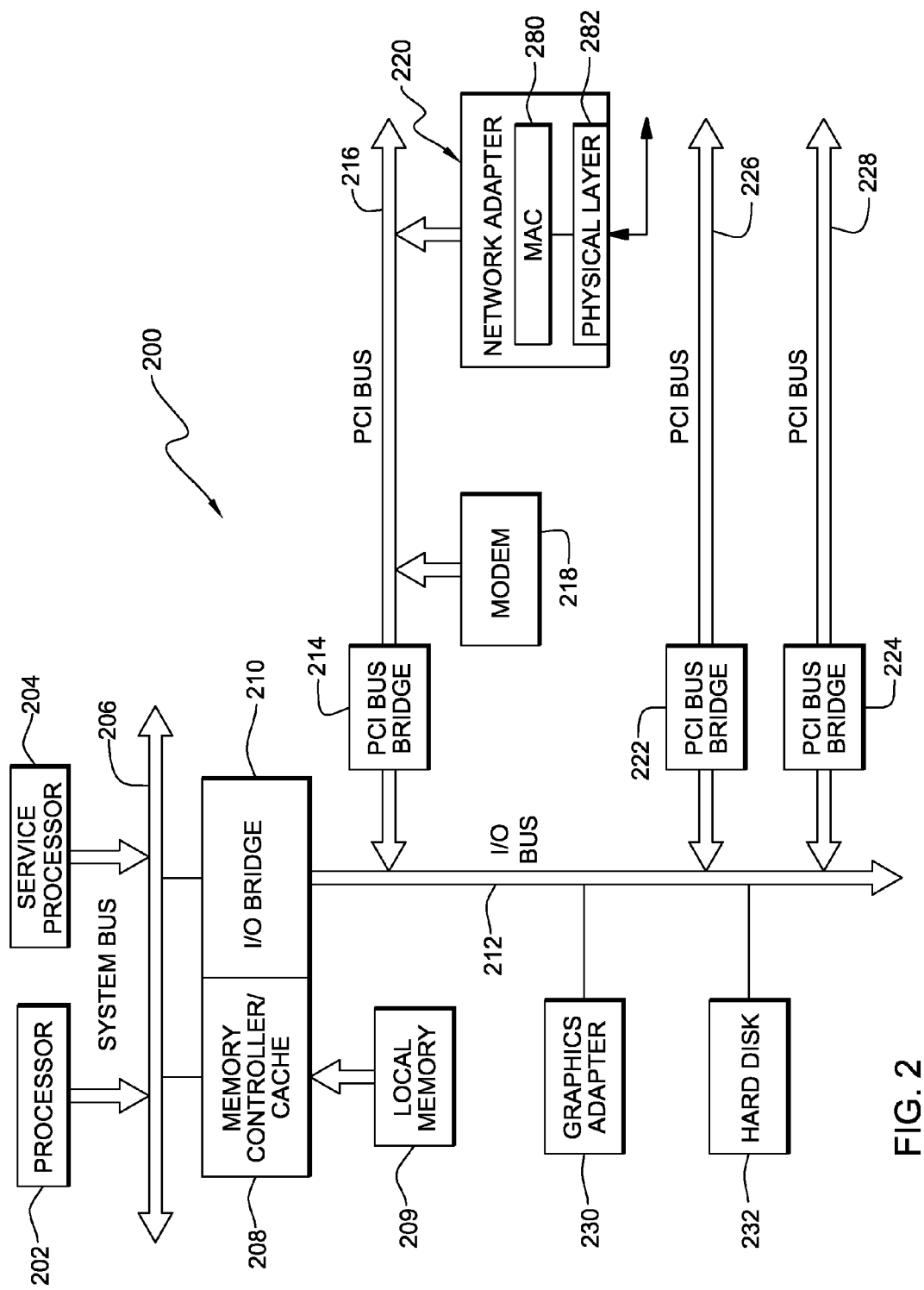
FIG. 2 is a more detailed illustration of a data processing system which could be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, the data processing system implementing a partition adjunct such as described hereinbelow can be built upon technologies found in IBM's p/i Series product line firmware and systemware, such as described in the "Power Architecture Platform Reference" (PAPR) material at Power.org (http://www.power.org/members/developers/specs/PAPR_Version_2.2_09Oct07.pdf), which is hereby incorporated herein by reference in its entirety.

Disclosed hereinbelow is the concept of a partition adjunct, which is a partition that is more limited than a full, logical partition. As described below, the partition adjunct runs in a flat, static effective address space and problem state. These restrictions permit the hypervisor to apply a range of hypervisor and processor optimizations that result in a substantial decrease in system overhead associated with a context switch of the state machine from a logical partition to state data of a partition adjunct, that is, compared to a context switch of the state machine between logical partitions. In other respects, a partition adjunct is similar to a full logical partition. For example, a partition adjunct can be assigned resources, either physical or virtual, similar to a full logical partition. Further, a partition adjunct can be an end-point of a virtual input output (VIO) communications mechanism, similar to a full logical partition, such as a virtual input output server (VIOS).

Figure 3:
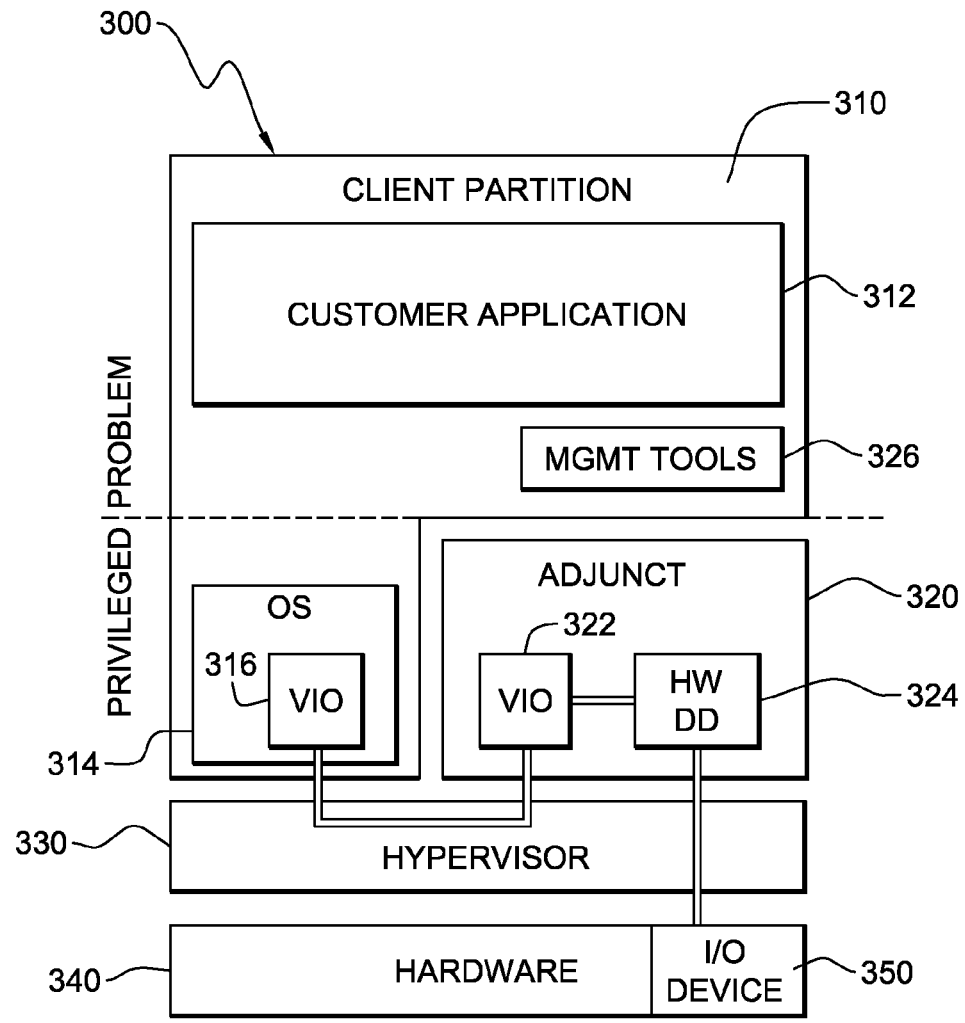
FIG. 3 illustrates one embodiment of a data processing system comprising a client logical partition and a partition adjunct, in accordance with an aspect of the present invention.

FIG. 3 illustrates one example of a data processing system 300, comprising a client logical partition (or simply client partition) 310 and a partition adjunct 320, in accordance with an aspect of the present invention. Client partition 310 is a logical partition which comprises one or more customer applications 312, an operating system instance 314 and a virtual I/O facility 316. Client partition 310 runs atop a hypervisor 330, and provides higher-level function than that provided by the hypervisor itself. Hypervisor 330 executes atop the underlying system hardware 340, which is shown to include one or more I/O devices 350.

Partition adjunct 320 is conceptually a child partition to client partition 310. The partition adjunct is less than a full logical partition, but is run in a manner whereby the hypervisor enforces security and isolation between the partition adjunct and the client partition it runs within. The partition adjunct is provided with reduced functionality compared with a full logical partition, for example, has no access to memory management unit (MMU) configuration or floating-point facilities, and is an environment that only the functionality needed to run the desired service (e.g., I/O driver) is provided. In the illustrated example, partition adjunct 320 includes a virtual I/O interface 322 and a hardware device driver service 324, which allows access to I/O device 350. In operation, client partition 310 accesses I/O device 350 via the partition adjunct 320, as illustrated. By reducing functionality within the partition adjunct environment, the run time overhead of dispatching and maintaining the partition adjunct (compared with another full logical partition) is reduced, and consequently, many of the performance disadvantages of using a separate logical partition as a virtual input output server (VIOS) are avoided.

As a specific example, the partition adjunct is described herein as running a reduced operating system environment for a device driver service. This service is provided by way of example only. The partition adjunct provides minimal, optimized, infrastructure comprising only (in one example) the structure needed by a device driver. For instance, if a Linux device driver is to run inside of the partition adjunct, then the minimal execution environment includes only the Linux kernel services or equivalent services, that the Linux device driver requires. If an AIX device driver is to run inside of the partition adjunct, then the minimal execution environment includes only the AIX kernel services, or equivalent services, that the AIX device driver requires. Advantageously, the partition adjunct runs in hypervisor/problem-state, directly against hypervisor interfaces. As explained in detail below, dispatching of the partition adjunct does not require a full partition context switch, which simplifies adjunct kernel requirements. This is achieved, in part, by mapping the partition adjunct into the client partition's virtual address page table. Client partition to partition adjunct isolation can be achieved, for example, via hypervisor-managed memory keys. Advantageously, the partition adjunct is not customer viewable. Further, the same partition adjunct service (referred to herein as a global partition adjunct service) may be instantiated within multiple client partitions, as explained below.

Figure 4A:
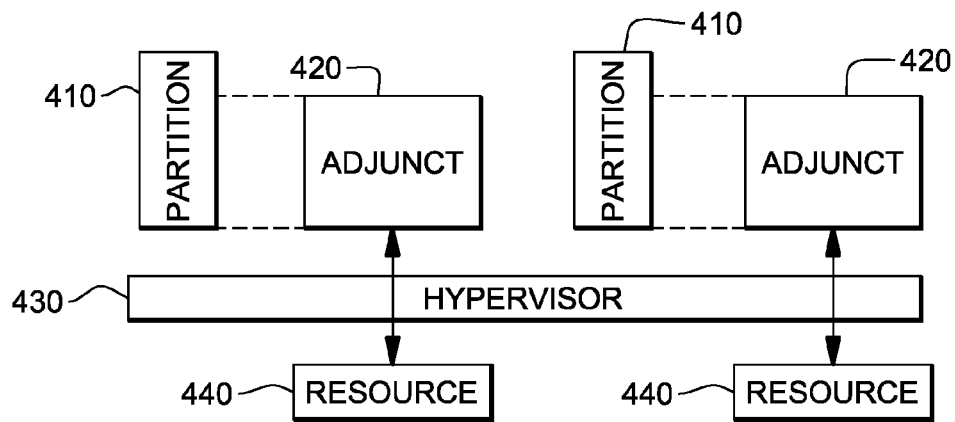
FIG. 4A illustrates a data processing system comprising multiple logical partitions and multiple partition adjuncts, in accordance with an aspect of the present invention.
Figure 4B:
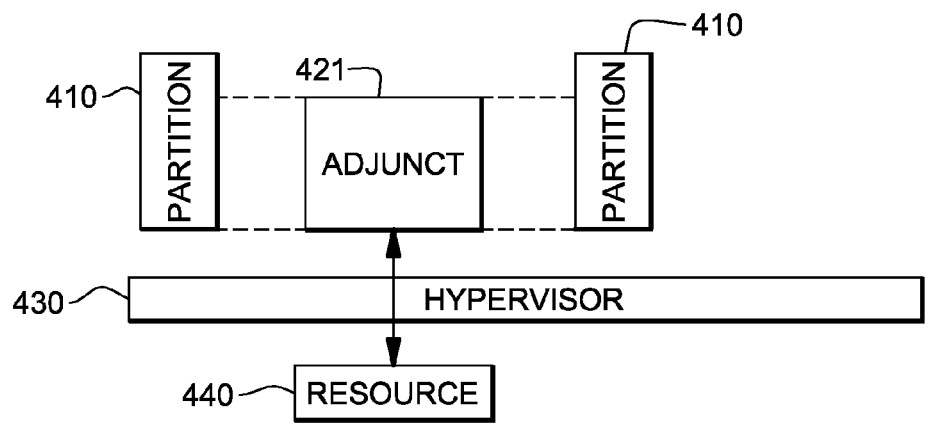
FIG. 4B illustrates a data processing system wherein multiple logical partitions attach a global partition adjunct, in accordance with an aspect of the present invention.
Figure 4C:
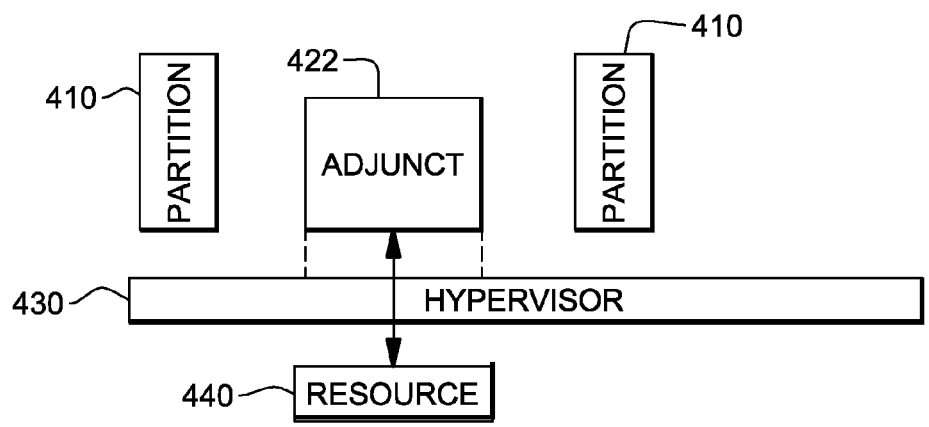
FIG. 4C depicts a data processing system wherein a hypervisor employs a partition adjunct, in accordance with an aspect of the present invention.

FIGS. 4A-4C depict various partition adjunct usage models which can be implemented in accordance with the concepts disclosed herein for addressing a number of operating system and platform issues. FIG. 4A illustrates one example of a partition adjunct 420 (also referred to in this example as a local partition adjunct), which conceptually, partially resides within an initiating client partition 410 for accessing dedicated resources 440 through a hypervisor 430. For example, a common adapter/driver service may be provided by partition adjunct 420 for a respective dedicated adapter (i.e., resource).

FIG. 4B illustrates an example of a global partition adjunct, wherein, (for example) a service logical partition such as a virtual input output server partition, donates memory and physical resources for instantiation of the partition adjunct. Such a global partition adjunct 421 is accessible or attachable by multiple client partitions 410, and provides, for example, input output services to a resource 440 via hypervisor 430. As a specific example, the global partition adjunct may comprise a common adapter driver service, and the resource a shared adapter.

FIG. 4C is an alternate embodiment of a global partition adjunct 422, wherein hypervisor 430 provides resources for the adjunct. In this implementation, the hypervisor employs the partition adjunct for its own use, for example, for protection or isolation services that would otherwise exist in the hypervisor's execution domain.

Unless otherwise specified, the partition adjunct embodiment described hereinbelow is assumed to be an execution environment that is part of a client partition, yet separated from the client partition by hypervisor isolation and security mechanisms, such as described below in greater detail with reference to FIGS. 23-26C. Further details of partition adjunct processing and usage are described in greater detail in commonly assigned, co-filed patent applications entitled: "Partition Adjunct for Data Processing System", Ser. No. 12/110,923; "Client Partition Scheduling and Prioritization of Service Partition Work", Ser. No. 12/110,953; "Partition Adjunct With Non-Native Device Driver for Facilitating Access to a Physical Input/Output Device", Ser. No. 12/110,982; and "Multiple Partition Adjunct Instances Interfacing Multiple Logical Partitions to a Self-Virtualizing Input/Output Device", Ser. No. 12/111,020, the entirety of each of which is also hereby incorporated herein by reference.

Figure 5:
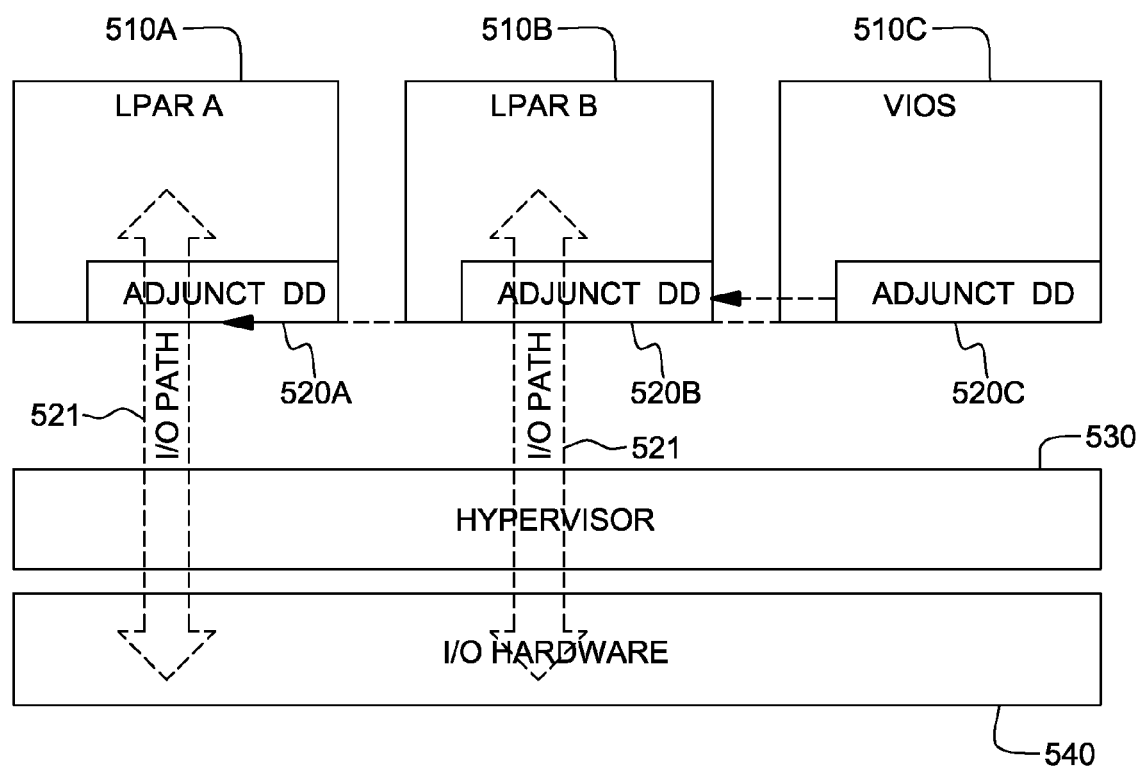
FIG. 5 illustrates a data processing system wherein a global partition adjunct, comprising a device driver service, is attached by multiple client partitions instead of employing a conventional virtual input output server, in accordance with an aspect of the present invention.

FIG. 5 illustrates one detailed example of a global partition adjunct being employed by multiple client partitions, that is, the embodiment of FIG. 4B. In this example, logical partitions (LPAR A, LPAR B) 510A, 510B are client partitions, and partition 510C is a virtual input output server partition employed by client partitions 510A, 510B in, for example, providing an input/output service. In accordance with the present invention, the input/output service (referred to as the adjunct device driver 520 in this example), is a partition adjunct provided device driver service 520A, 520B for accessing input/output hardware 540 via one or more input/output paths 521 through hypervisor 530. In this example, the partition adjunct facilitates a more direct attachment or more direct path from each client partition to the input/output hardware. As described further below, the partition adjunct is incorporated into the virtual address spaces respectively donated by the client partitions employing the partition adjunct instances.

In order for a partition adjunct to be a runable program, the hypervisor, along with a client partition that is to use the partition adjunct service, negotiate to establish the partition adjunct environment. Once this negotiation is complete, the client partition will have donated a portion of its virtual address space to the hypervisor for use by the partition adjunct. The hypervisor will use hardware and hypervisor facilities to ensure that the client partition no longer has access to or can modify the donated resources (e.g., the donated virtual address space). The hypervisor instantiates the effective address mappings required to run the partition adjunct using the donated virtual address resources. Subsequently, the hypervisor may switch between dispatching the client partition or the partition adjunct by reprogramming its control of the donated virtual address space. When the client partition runs, it may access all virtual address space assigned to it, except for the donated virtual address range, and when the partition adjunct runs, the hypervisor disables access to all virtual addresses of the client partition, except for the donated virtual address range, that is, the virtual address space to which it is enabled. This toggling of active/inactive virtual address ranges is significantly faster than reprogramming the full memory management and address translation hardware to effect a complete context switch of the current state machine between two full logical partitions, as is necessary to switch, for example, to a virtual input/output server partition. In this manner, the partition adjunct address space is carved out of and separated from the memory management and address translation hardware resources of the client partition. The partition adjunct is thus, from a processor's perspective, part of the client partition, but from the client partition's and hypervisor's perspective, is a distinct entity.

Advantageously, the partition adjunct concepts presented herein reduce the need to use full logical partitions for providing services to client partitions. This in turn frees up resources and improves performance for customer workloads. Additionally, the partition adjunct disclosed herein encourages the development and deployment of virtual platform services in lieu of development of operating system specific services by reducing the performance penalties associated with virtualized services. This in turn allows for savings and cost development, since services may be implemented only once (i.e., in a partition adjunct), rather than natively among multiple operating systems.

Various examples of protocol for instantiating and employing a partition adjunct are described below with reference to FIGS. 6-11.

Figure 6:
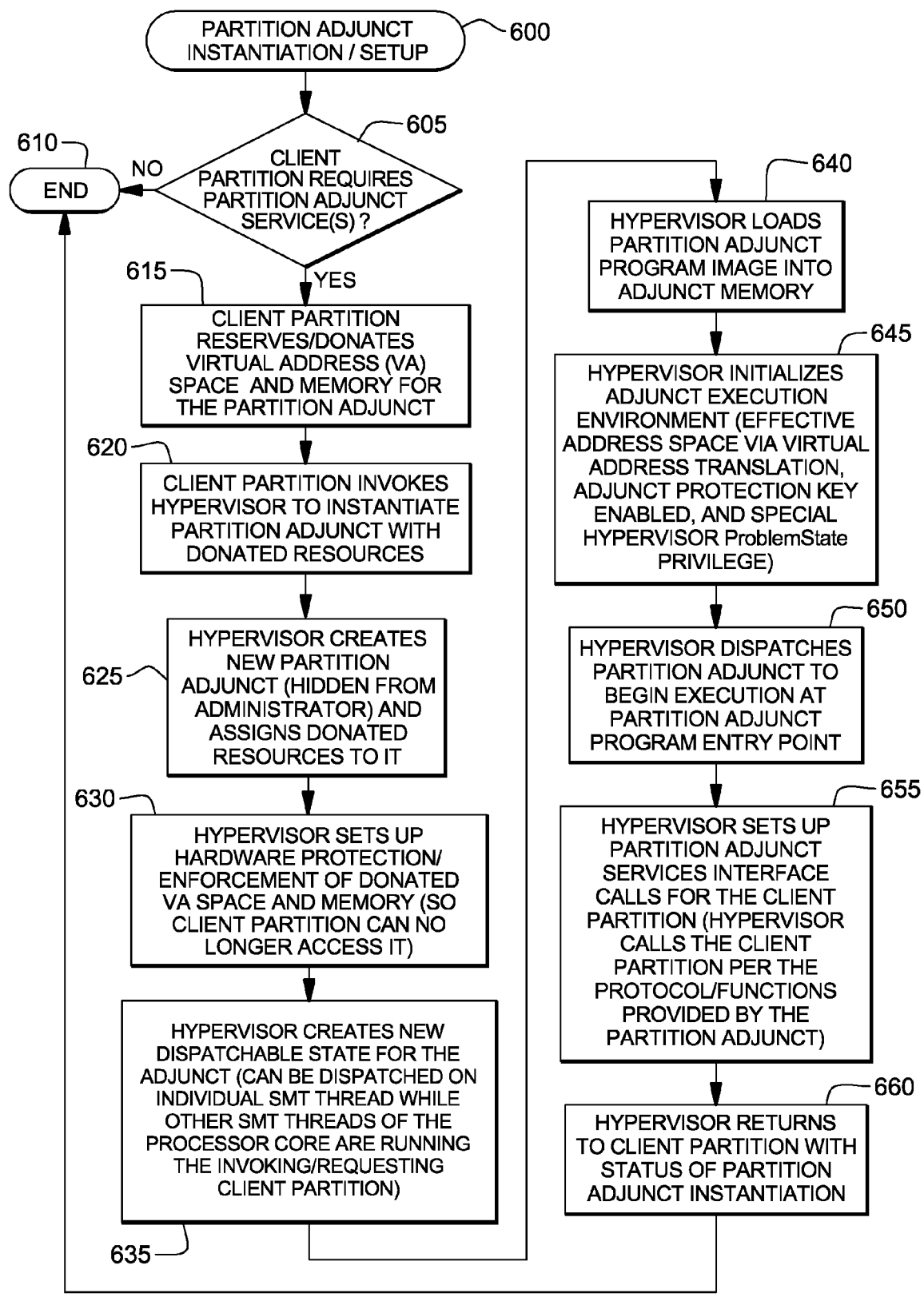
FIG. 6 is a flowchart of one embodiment of a process for creating a partition adjunct, in accordance with an aspect of the present invention.

FIG. 6 is a flowchart of one embodiment of a process for creating a local partition adjunct, for use such as depicted in FIG. 4A. The partition adjunct instantiation or setup protocol 600 begins with inquiry into whether the client partition wants a partition adjunct service 605. If "no", then the protocol ends 610. Otherwise, the client partition reserves a portion of its virtual address space and memory space for the partition adjunct 615 and invokes the hypervisor to instantiate the partition adjunct with these donated resources 620. The hypervisor creates the new partition adjunct (which is hidden from the administrator), and assigns the donated resources to the partition adjunct 625. Creating the new partition adjunct means that the hypervisor creates a dispatchable program context. The hypervisor sets up hardware protection and enforcement of the donated virtual address space and donated memory, so that the client partition can no longer access that space 630. Further, the hypervisor creates a new dispatchable state for the partition adjunct 635. This new dispatchable state means that the partition adjunct can be dispatched on an individual hardware (SMT) thread of a multithreaded hardware core, while other SMT threads of the processor core continue to run the client partition invoking the partition adjunct. This aspect of the present invention is described further below with reference to FIGS. 19-22.

Next, the hypervisor loads the partition adjunct program image into the donated adjunct memory 640 and initializes adjunct execution 645. Initializing a partition adjunct execution environment can include the hypervisor initializing effective address space to virtual address translation tables, adjunct protection keys, and special hypervisor problem state privileges. The hypervisor then dispatches the partition adjunct to begin execution at the partition adjunct program entry point 650, and the hypervisor sets up partition adjunct service interface calls for the client partition 655. The hypervisor calls or invokes the client partition per protocols or functions provided by the partition adjunct. The hypervisor then returns to the client partition with status of the partition adjunct instantiation 660.

Figure 7:
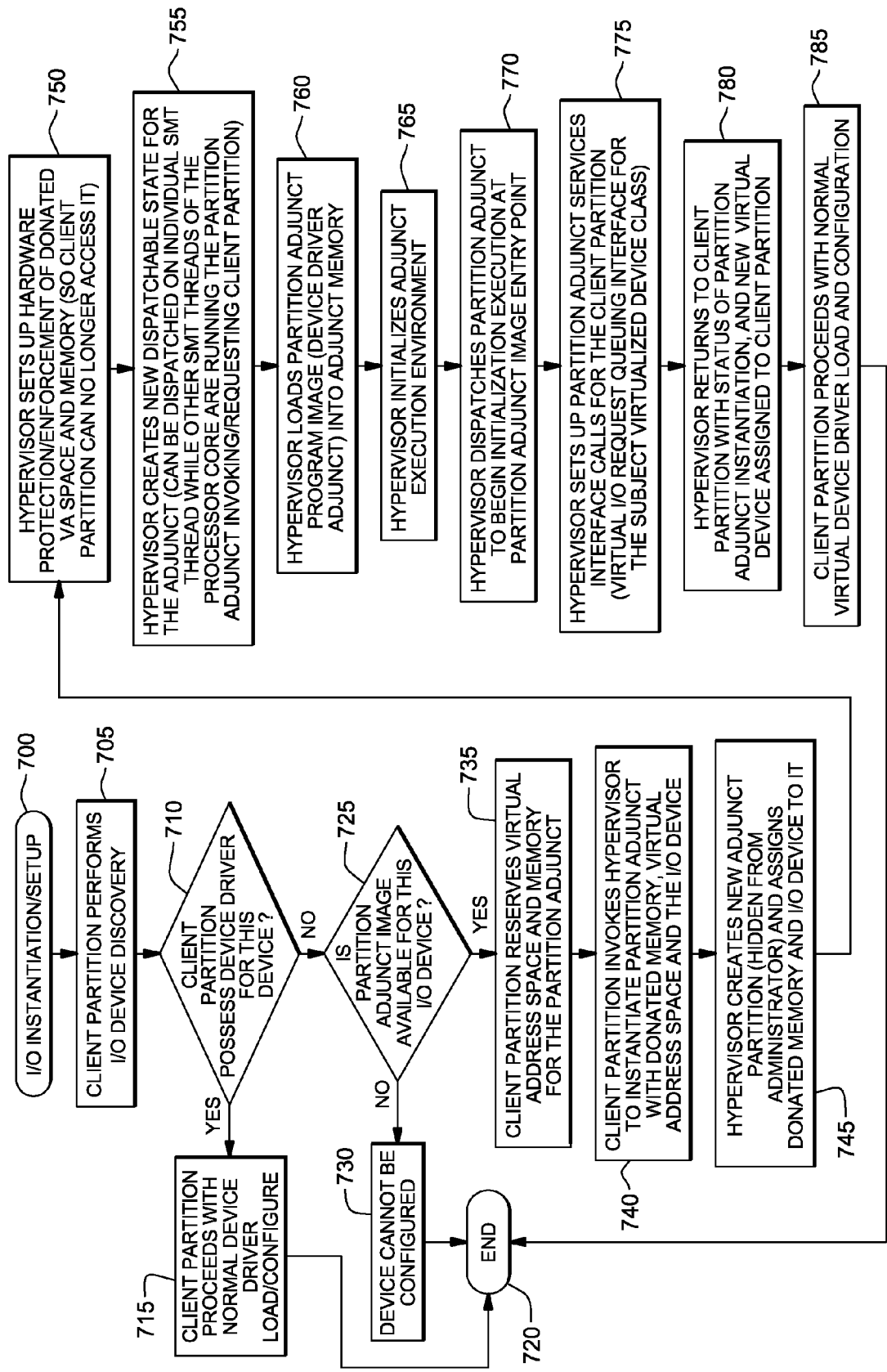
FIG. 7 is a flowchart of a more detailed embodiment of a process for creating a partition adjunct comprising a device driver, in accordance with an aspect of the present invention.

FIG. 7 depicts one detailed example of a process for creating a local partition adjunct, in accordance with an aspect of the present invention. In this example, the partition adjunct comprises a device driver service. Input/output instantiation or setup 700 begins with a client partition performing input/output device discovery 705. Processing inquires whether the client partition has its own device driver for a discovered input/output device 710. If "yes", then the client partition proceeds with normal device driver load and configuration 715, which ends processing 720. If the client partition does not have its own device driver for a discovered I/O device, then processing determines whether a partition adjunct image is available for this I/O device 725. If "no", then the device cannot be configured 730, and processing ends 720.

Assuming that a partition adjunct image is available, then the client partition reserves or donates a portion of its virtual address space and memory space for the partition adjunct image 735, and invokes the hypervisor to instantiate the partition adjunct with the donated virtual address space and memory space, as well as the I/O device 740. The hypervisor creates the new partition adjunct and assigns the donated resources to the partition adjunct 745. The hypervisor then sets up appropriate hardware protection and enforcement of the donated virtual address space and memory space, so that the client partition can no longer access the donated space 750. A new dispatchable state for the partition adjunct is created by the hypervisor 755. As noted above, this new dispatchable state can advantageously be dispatched on a single hardware thread of an SMT data processing system, while other hardware threads continue to run the invoking (or requesting) client partition. The hypervisor loads the partition adjunct image into the donated adjunct memory 760, and initializes the partition adjunct execution environment 765. The partition adjunct is then dispatched to begin initialization execution at the partition adjunct image entry point 770. The hypervisor sets up partition adjunct service interface calls for the client partition, which include, for example, a virtual input/output request queuing interface for the subject virtualized device class 775. The hypervisor returns to the client partition with the status of the partition adjunct instantiation, and the new virtual device assigned to the client partition 780, and the client partition proceeds with normal virtual device driver load and configuration 785.

Figure 8:
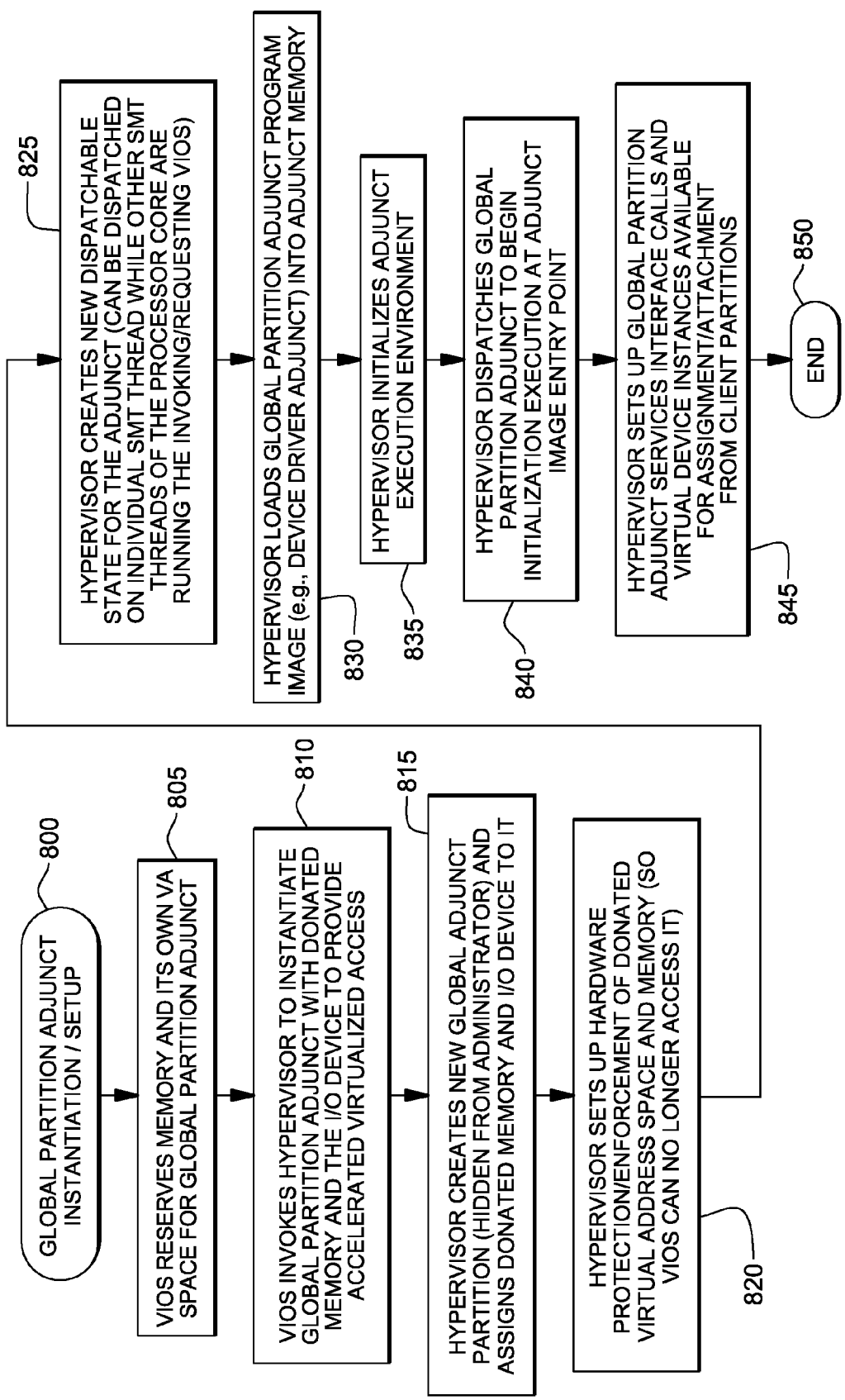
FIG. 8 is a flowchart of one embodiment of a process for creating a global partition adjunct employable by multiple logical partitions of a data processing system, in accordance with an aspect of the present invention.

FIG. 8 is a flowchart of one embodiment of a process for instantiating a global partition adjunct, such as depicted in FIG. 4B. In this example, the partition adjunct instantiation begins from a logical partition which functions as a virtual input output server (VIOS). The adjunct instantiation setup protocol 800 begins with the VIOS reserving or donating part of its memory space and virtual address space for the global partition adjunct 805. The VIOS invokes the hypervisor to instantiate the global partition adjunct with the donated memory and virtual address space, as well as the I/O device to which accelerated, virtualized access is to be provided 810. The hypervisor creates the new global partition adjunct, again hidden from the administrator, and assigns to the partition adjunct the donated memory space and the I/O device 815. The hypervisor sets up the hardware protection and enforcement of the donated virtual address space and memory space, so that the VIOS can no longer access the donated space 820. The hypervisor creates a new dispatchable state for the partition adjunct 825, which can be dispatched on an individual SMT thread, while one or more other SMT threads of a multithreaded hardware processor core continue to run the VIOS partition invoking the partition adjunct 825. The hypervisor loads the global partition adjunct program image into the donated adjunct memory 830, and initializes the adjunct execution environment 835. The hypervisor then dispatches the global partition adjunct to begin initialization execution at the adjunct image entry point 840, and sets up the global partition adjunct service interface call(s) and virtual device instance(s) available for assignment or attachment from client partitions 845, which completes the processing protocol 850.

Figure 9:
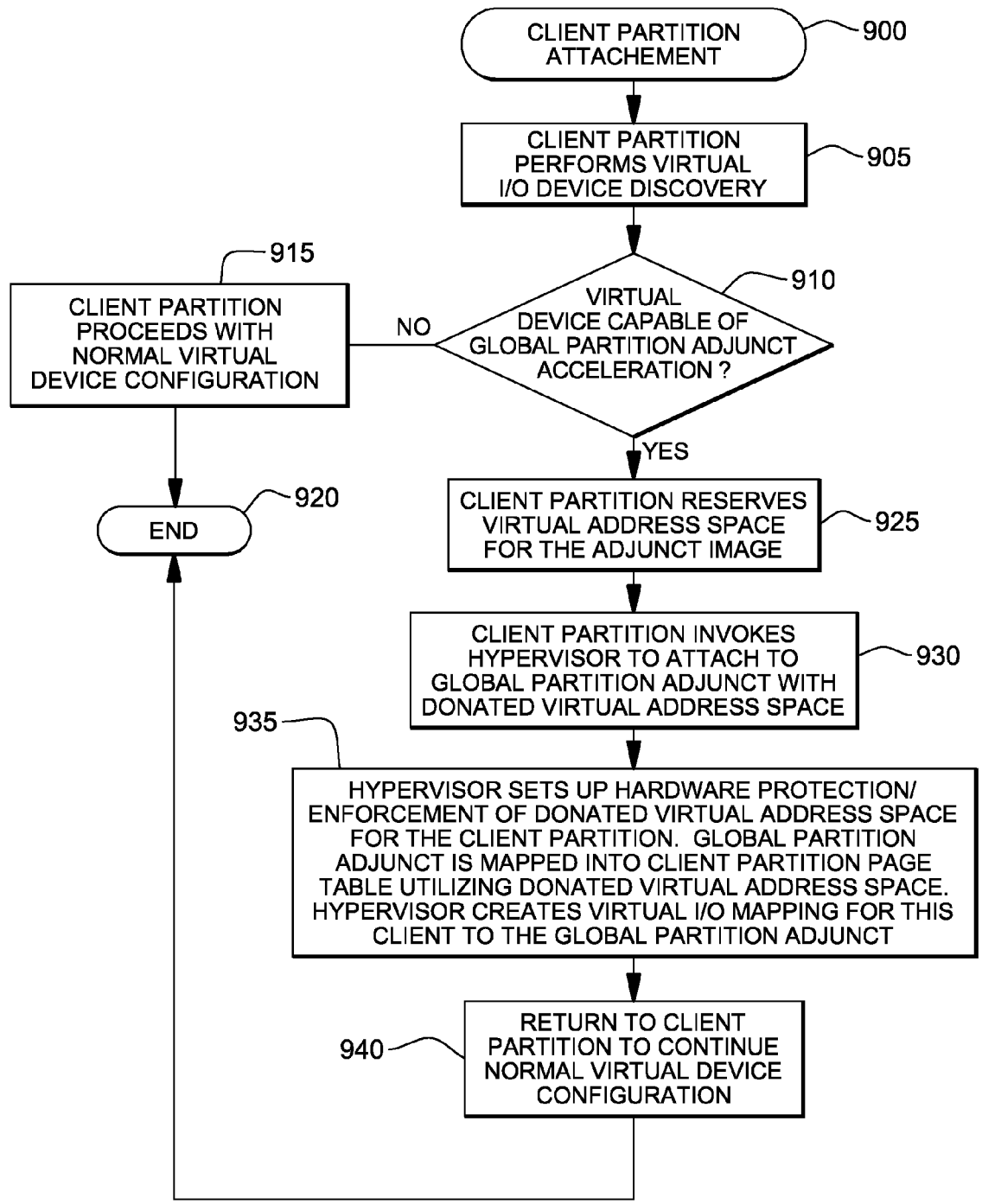
FIG. 9 is a flowchart of one embodiment of a process for attaching to a global partition adjunct from a client logical partition, in accordance with an aspect of the present invention.

FIG. 9 depicts one example of a process for attaching to a global partition adjunct, such as a VIOS partition adjunct created as described above in connection with FIG. 8. This client partition attachment 900 begins with the client partition performing virtual I/O device discovery 905. Processing determines whether the virtual I/O device at issue is capable of global partition adjunct acceleration 910, that is, whether the adjunct service globally exists. If "no", then the client partition proceeds with normal virtual device configuration 915, for example, using a VIOS, which ends the processing 920. If a virtual I/O device adjunct image is available, then the client partition reserves or donates virtual address space for the adjunct 925, and invokes the hypervisor to attach the global partition adjunct image with the donated virtual address space 930. The hypervisor sets up the hardware protection and enforcement of the donated virtual address space for the client partition 935, and the global partition adjunct is mapped into the client partition page table utilizing the donated virtual address space. The hypervisor creates a virtual I/O mapping for this client partition to the global partition adjunct. Thereafter, processing returns to the client partition to continue with normal virtual device configuration 940, which completes processing 920.

Figure 10:
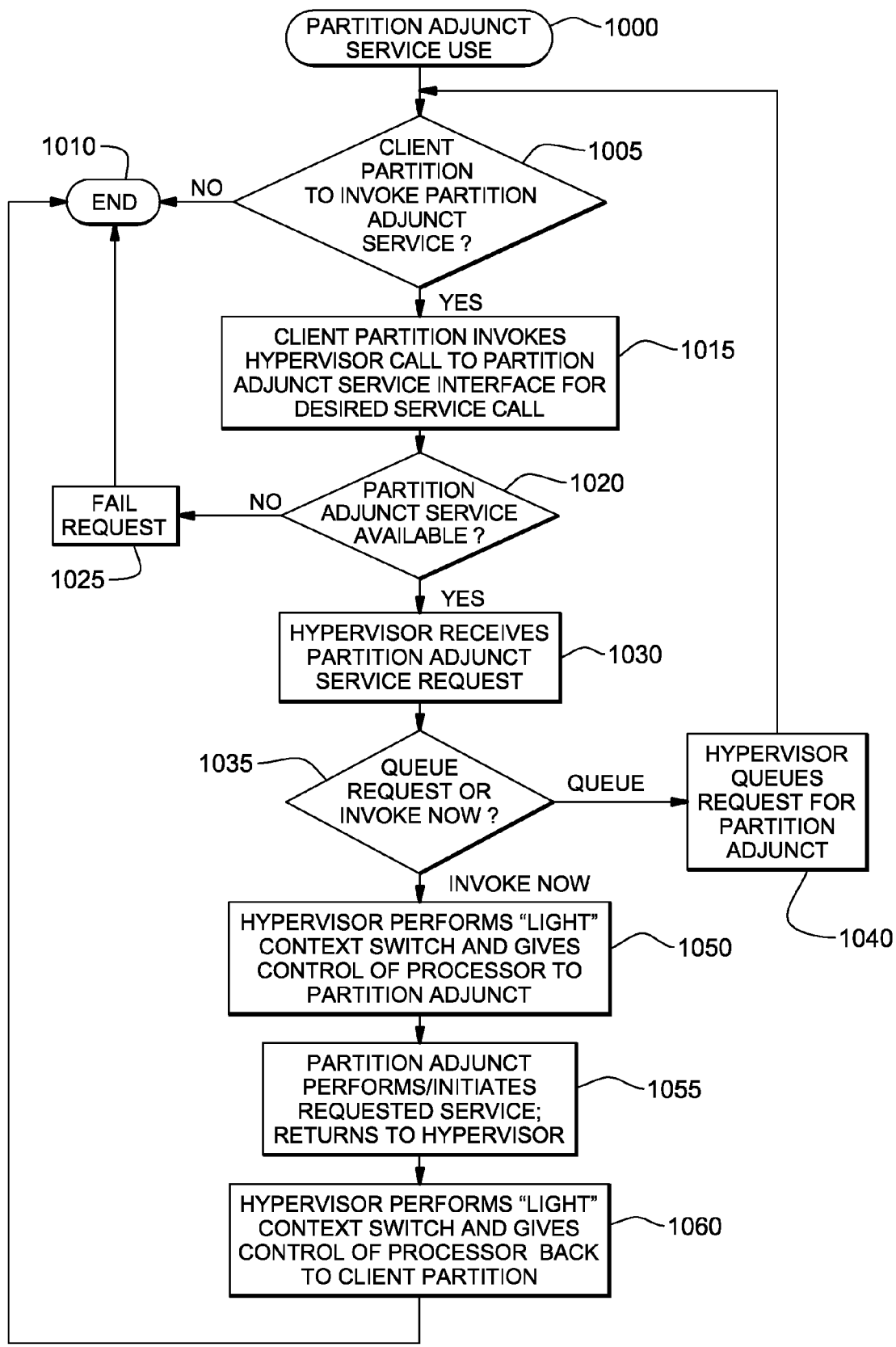
FIG. 10 is a flowchart of one embodiment of a process for processing a service request by a partition adjunct, in accordance with an aspect of the present invention.

FIG. 10 illustrates one embodiment of protocol for processing a service request by a partition adjunct submitted from a client partition. Partition adjunct servicing 1000 begins with inquiring whether the client partition needs to invoke the partition adjunct service 1005. If "no", then processing ends 1010. Otherwise, the client partition invokes a hypervisor call to the partition adjunct service interface for the desired adjunct service call 1015. Processing determines whether the partition adjunct service is available 1020. If "no", then the service request is failed 1025, and processing ends 1010.

Assuming that the partition adjunct service is available, then the hypervisor receives the partition adjunct service request 1030, and determines whether to queue the service request or invoke the service request currently 1035. If the service request is to be queued, then the hypervisor queues the service request for the partition adjunct 1040, and returns to inquire whether the client partition needs to invoke a partition adjunct service 1005. If the service request is to be currently invoked, then the hypervisor performs a "light" context switch of the current state machine, and gives control of the processor to the partition adjunct 1050. This light context switch is explained in detail below with reference to FIGS. 12-22. The partition adjunct performs or initiates the requested service, and then returns to the hypervisor 1055. The hypervisor performs a similar light context switch and gives control of the processor back to the client partition initiating the partition adjunct service 1060, which completes the processing 1010.

Figure 11:
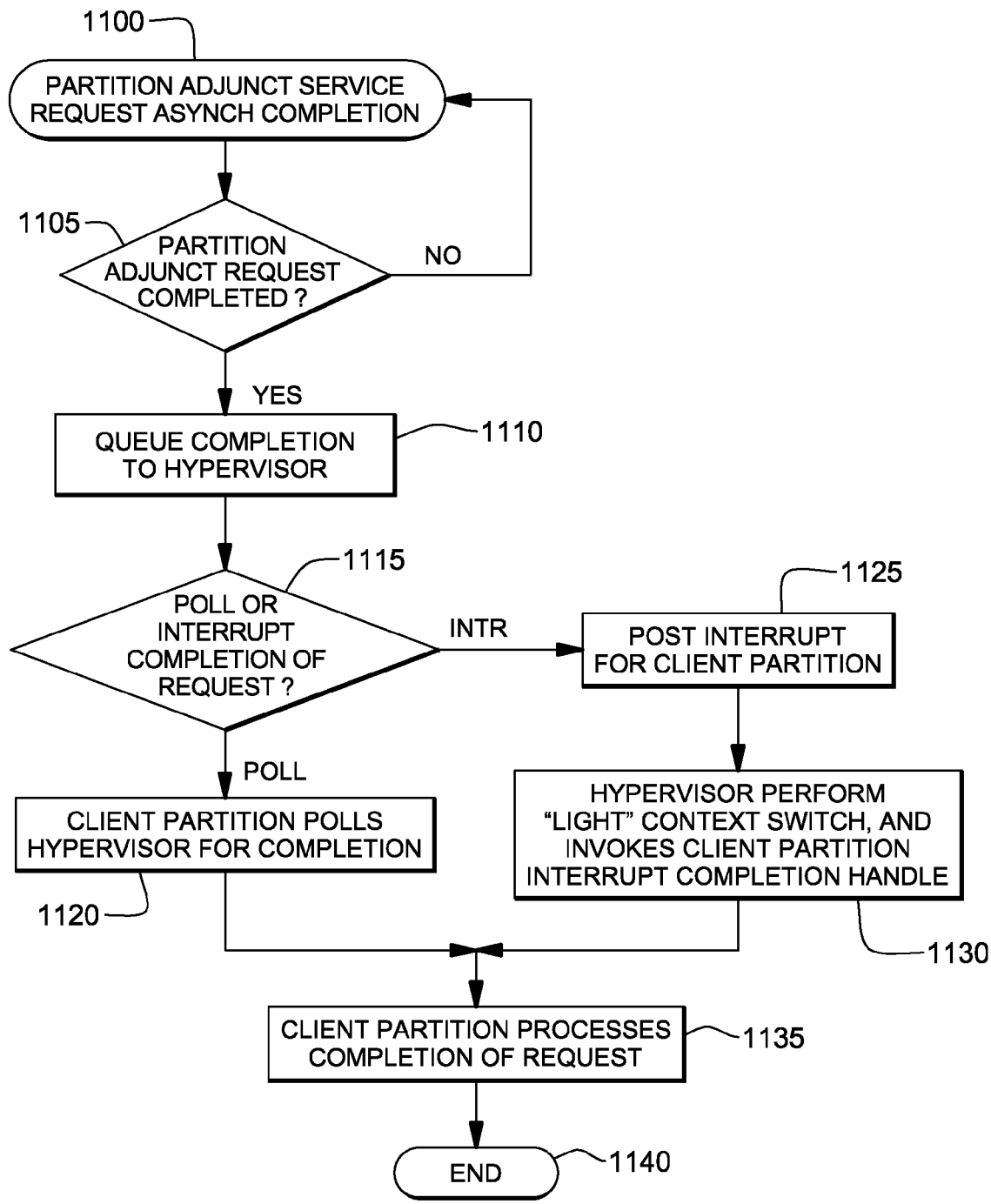
FIG. 11 is a flowchart of one embodiment of a process for asynchronous service request completion handling, in accordance with an aspect of the present invention.

FIG. 11 depicts a flowchart of one embodiment of protocol for asynchronously handling service request completion from a partition adjunct. Partition adjunct request completion processing 1100 begins with an inquiry confirming completion of the partition adjunct service request 1105. If request processing is not complete, then processing waits until the partition adjunct service request has been completed, at which point the completion of the service request is queued to the hypervisor 1110. Processing then determines whether the client partition is polling the hypervisor or expecting an interrupt from the hypervisor regarding the completion of the service request 1115. If polling is employed, the client partition polls the hypervisor for completion of the service request 1120, otherwise the hypervisor posts an interrupt for the client partition 1125. The hypervisor then performs the light context switch (described below) and invokes the client partition interrupt completion handler 1130. The client partition processes completion of the service request 1135, which completes the processing protocol 1140.

FIGS. 12-15 illustrate one example of a full logical partition to logical partition context switch within a data processing system. When context switching between two separate full partitions, each logical partition has its own distinct virtual address space assigned to it. When the hypervisor performs a full partition switch on an individual processor, the hypervisor must save and re-store processor context machine state (general purpose registers, floating point registers, special purpose registers, instruction address registers, etc.), as well as invalidate and reinitialize the memory management unit (MMU) hardware. This includes invalidating any address translation caches (e.g., translation lookaside buffer), since a full logical partition context switch also means switching to a different virtual address space, and changing the hardware page table pointers in the processor to point to the new logical partition's in-memory page table. The MMU impacts of a full logical partition context switch are the largest cost in performing a logical partition context switch, as the new logical partition must also re-establish all of its address translations upon reference each time it is dispatched. This is contrasted with the adjunct partition concept disclosed herein (since the adjunct and its client partition share a virtual address space), wherein the MMU hardware does not need to be invalidated or modified, only the subset of processor context/registers that the partition adjunct is allowed to use need to be saved and restored as part of the context switch of the state machine to the partition adjunct.

Figure 12:
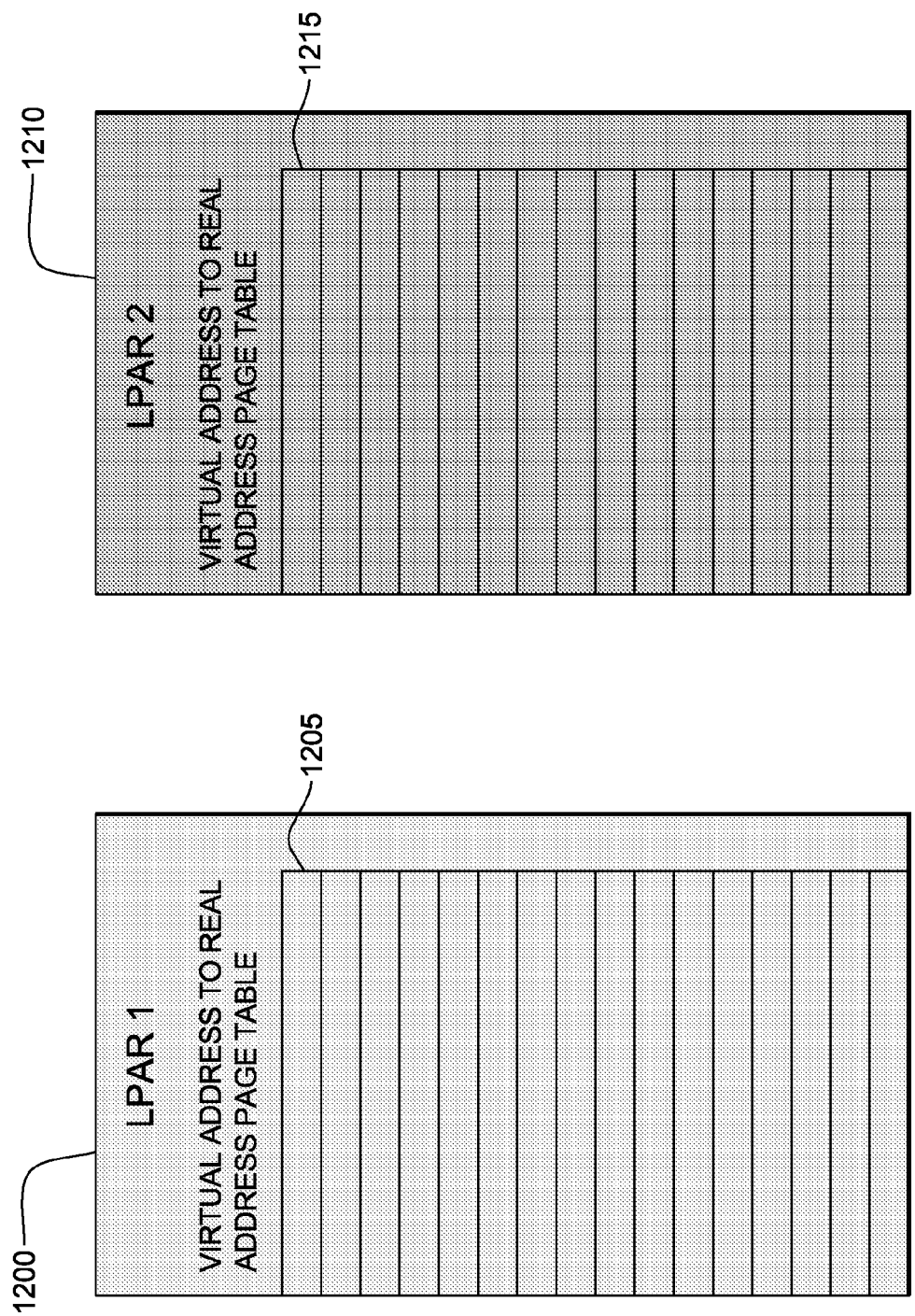
FIG. 12 illustrates two conventional logical partitions of a data processing system.

As illustrated in FIG. 12, a first logical partition (LPAR 1) 1200 includes a virtual address to real address page table 1205, which comprises the range of virtual addresses assigned to LPAR 1. Similarly, a second logical partition (LPAR 2) 1210 includes a virtual address to real address page table 1215, which comprises the range of virtual addresses assigned to LPAR 2. The virtual address space range employed by LPAR 1 is separate from the virtual address space employed by LPAR 2, and one logical partition cannot access the virtual address space of the other logical partition.

Figure 13:
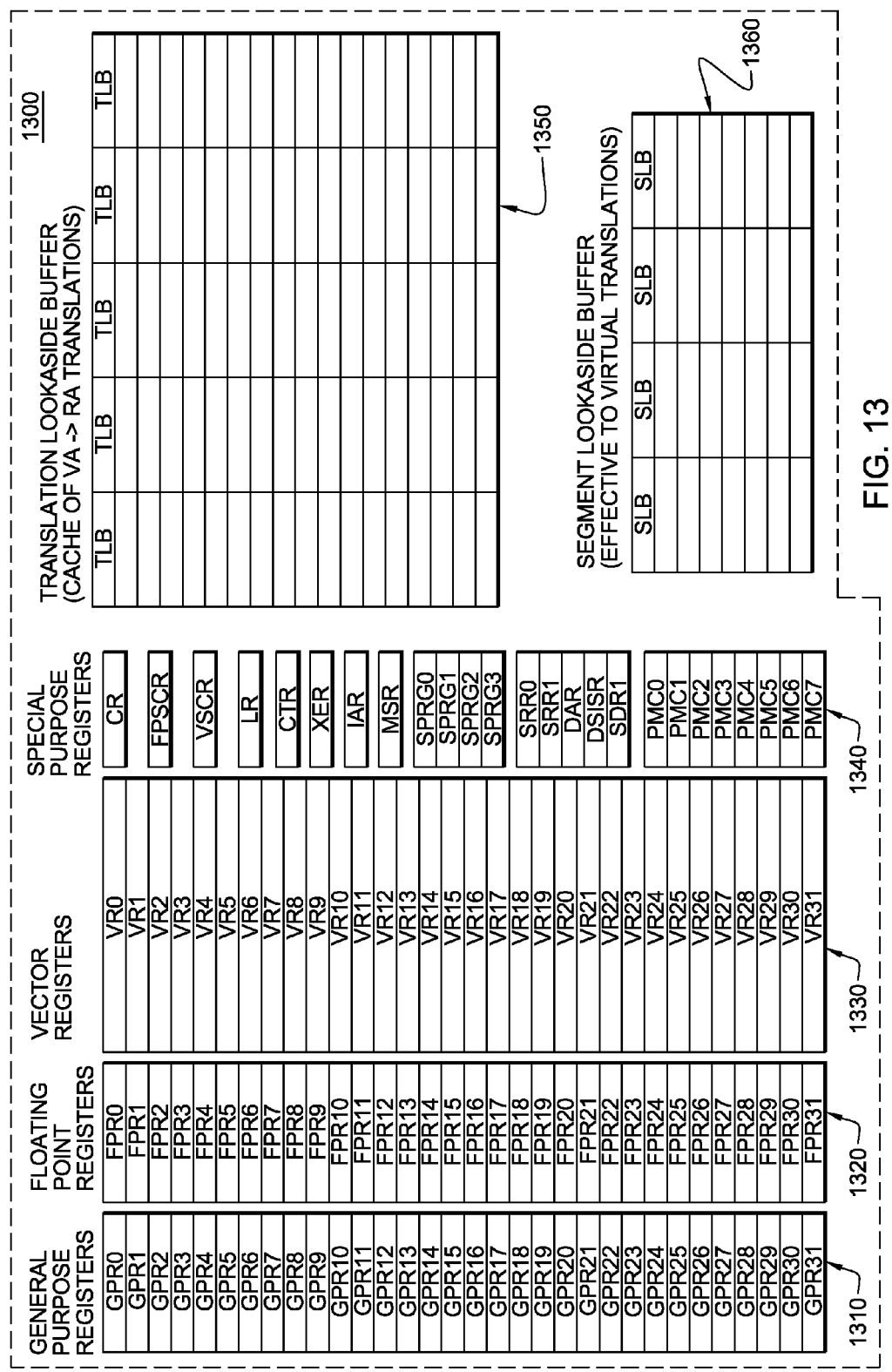
FIG. 13 illustrates conventional processor register machine state and memory management and address translation hardware of a data processing system.

FIG. 13 illustrates one example of a processor machine state including memory management and address translation hardware of a processor core machine 1300. The illustrated hardware includes general purpose registers 1310, floating point registers 1320, vector registers 1330, special purpose registers 1340, a translation lookaside buffer 1350, and a segment lookaside buffer 1360. The translation lookaside buffer is a cache of virtual address to real address translations, while the segment lookaside buffer contains effective to virtual address translations.

Figure 14:
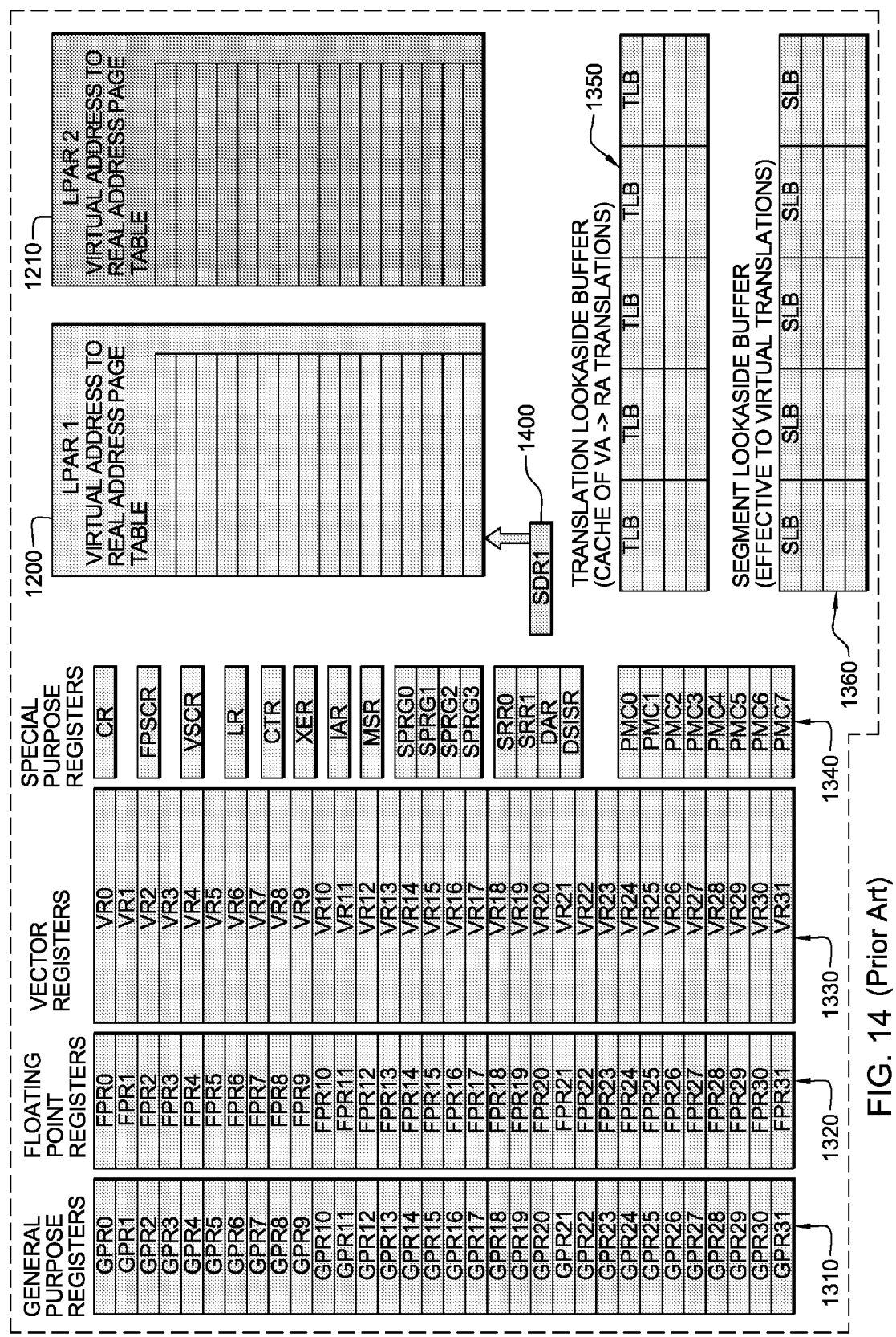
FIG. 14 illustrates the processor register machine state and memory management unit hardware of FIG. 13, with LPAR 1 conventionally dispatched in an active state.

In FIG. 14, LPAR 1 is assumed to be dispatched, i.e., in an active or running state in the processor state machine. As illustrated, this LPAR 1 running machine state comprises state data in general purpose registers 1310, floating point registers 1320, vector registers 1330, special purpose registers 1340, translation lookaside buffer 1350, and segment lookaside buffer 1360. A special purpose register SDR1 1400 points to, and therefore, empowers, the virtual address to real address page table of the logical partition in running state, that is, LPAR 1 1200 in this example. LPAR 2 1210 is in an inactive state.

Figure 15:
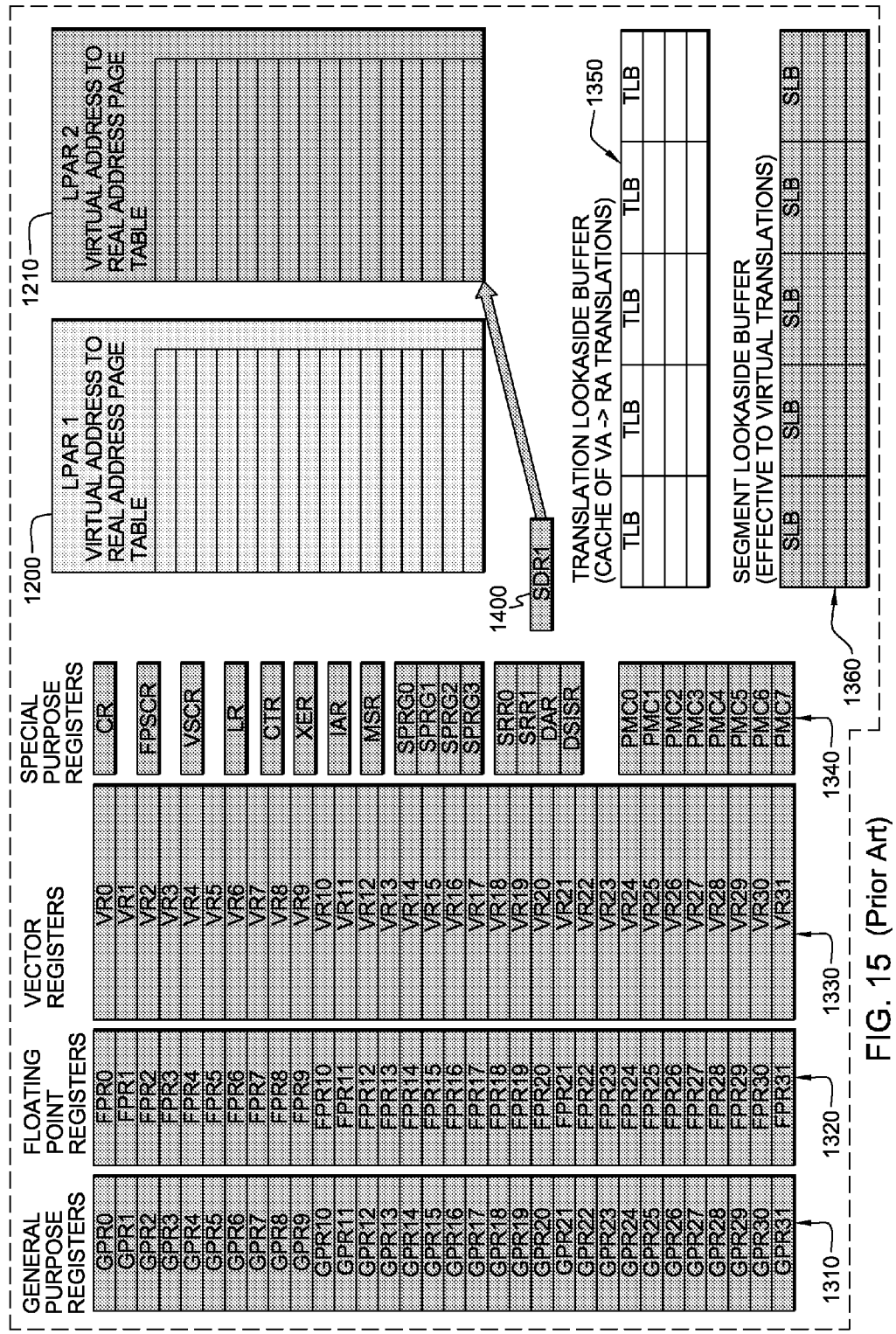
FIG. 15 illustrates the processor register machine state and memory management unit hardware of FIG. 13, with LPAR 1 switched out, and LPAR 2 dispatched in the active state.

FIG. 15 illustrates status of the processor core machine state after LPAR 1 has been switched out and LPAR 2 switched in. As illustrated, the machine state data of LPAR 2 1210 is restored within general purpose registers 1310, floating point registers 1320, vector registers 1330, and special purpose registers 1340. The special purpose register SDR1 1400 in this case is switched to point to the virtual to real address table of LPAR 2 1210, with LPAR 1 1200 being inactive. As a result, the segment lookaside buffer 1360 is restored with LPAR 2 state data, and the translation lookaside buffer 1350 is invalidated. This buffer will fill as LPAR 2 accesses memory addresses.

Figure 16:
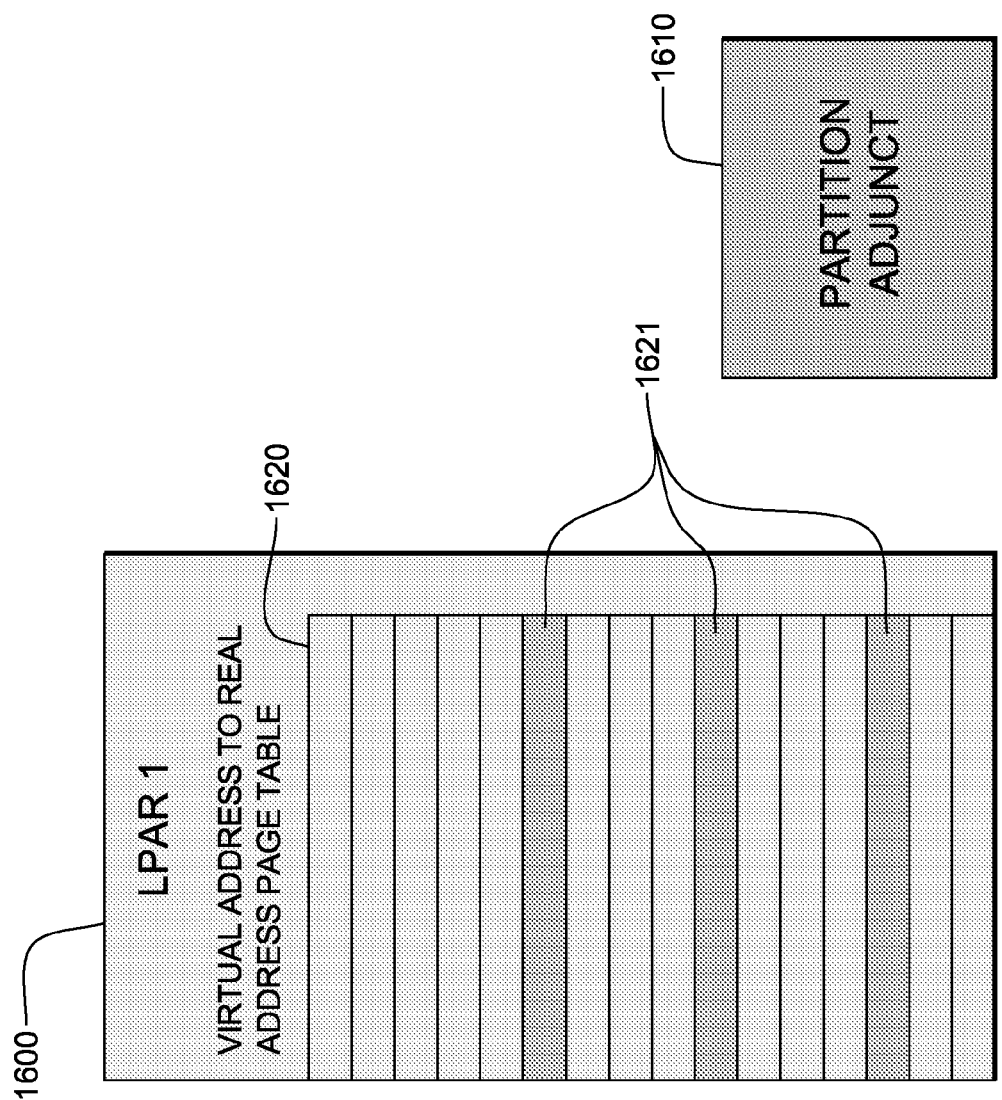
FIG. 16 illustrates a data processing system comprising a logical partition (LPAR 1) and a partition adjunct, in accordance with an aspect of the present invention.
Figure 17:
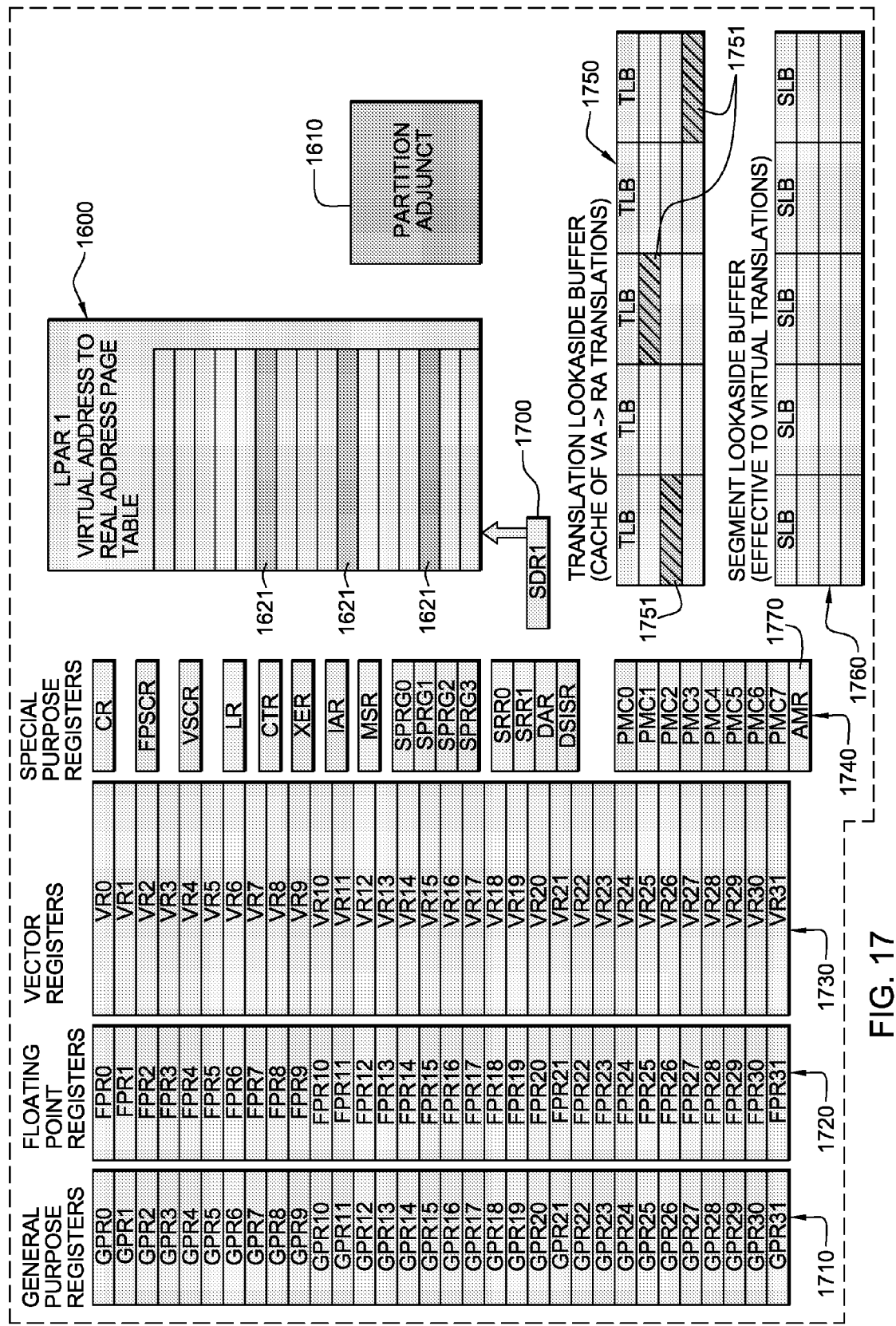
FIG. 17 illustrates processor register machine state and memory management and address translation hardware of the data processing system of FIG. 16, with LPAR 1 dispatched in an active state, and illustrating shared virtual address space between LPAR 1 and the partition adjunct, in accordance with an aspect of the present invention.
Figure 18:
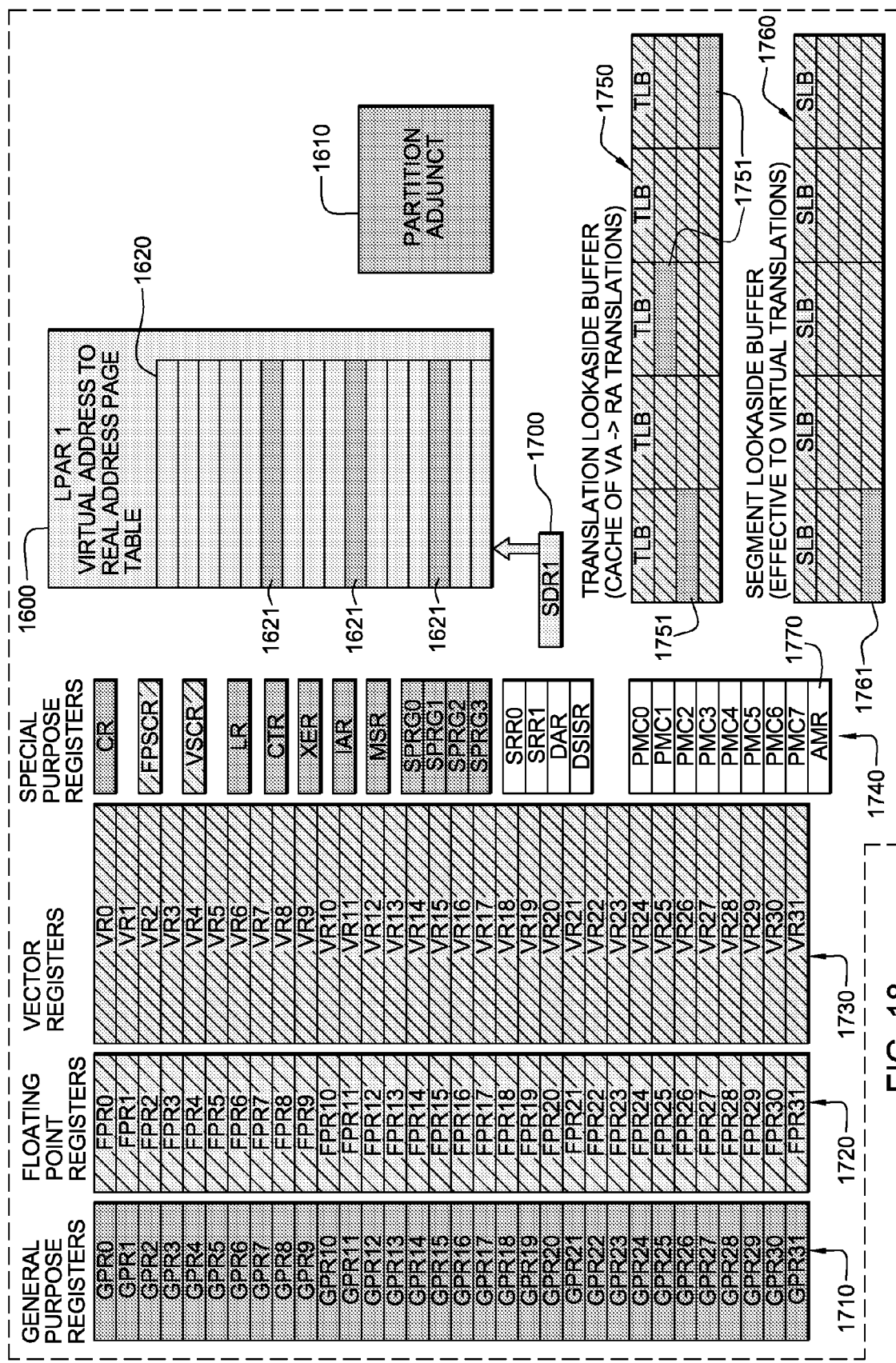
FIG. 18 illustrates the processor register machine state and memory management and address translation hardware of FIG. 17 after context switching the current state machine from LPAR 1 to dispatch the partition adjunct, in accordance with an aspect of the present invention.

In contrast, FIGS. 16-18 illustrate context switching of the current machine state from a logical partition to a partition adjunct, in accordance with an aspect of the present invention. FIG. 16 depicts one embodiment of a data processing system comprising a logical partition 1600 (LPAR 1), which includes a virtual address to real address page table 1620. The data processing system further includes a partition adjunct 1610. In this example, three page table entries 1621 are set aside to map the partition adjunct into the virtual address space of the logical partition. This example assumes that logical partition 1600 is a client partition which initiates the partition adjunct 1610. Thus, as illustrated in FIG. 16, the initiating logical partition has donated virtual address space to the partition adjunct, and the partition adjunct virtual address space resides in the same virtual address range as the initiating logical partition. This is represented by the page table entries being set aside for the partition adjunct being within the virtual address to real address page table 1620 of LPAR 1. As noted above, from the hypervisor's standpoint, in terms of scheduling and isolation, the partition adjunct is a fully separate partition from the initiating logical partition (LPAR 1). Notwithstanding that, the partition adjunct and the logical partition share a virtual address space range as represented.

FIG. 17 illustrates an example of the processor core machine state with LPAR 1 dispatched in an active, running state. As illustrated, LPAR 1's machine state data acquires general purpose registers 1710, floating point registers 1720, vector registers 1730, and special purpose registers 1740. In addition, the partition's machine state substantially fills the translation lookaside buffer 1750, and fills the segment lookaside buffer 1760. Special purpose register SDR1 1700 points to the virtual address to real address page table 1620 of LPAR 1 1600. In this example, partition adjunct 1610 is in the inactive state. As illustrated, translation lookaside buffer 1750 may still contain one or more entries 1751 for the partition adjunct from a prior time that the adjunct was run. These entries 1751 do not need to be invalidated, since logical partition 1600 is protected from accessing those virtual addresses via hardware protection keys used to isolate subportions of the single logical partition address space. For example, page protection mechanisms, such as using a protection key, controlled by a special purpose register, labeled access mask register (AMR) 1770 may be employed. The AMR register 1770 may hold keys that are actively turned on at any given moment. For a page table entry to be referenced, the associated keys must be enabled in the AMR register. When the hypervisor is running LPAR 1, the hypervisor sets the protection key so that LPAR 1 cannot get access to the page table entries 1621, or the entries 1751 of translation lookaside buffer 1750. Further details of this protection and isolation scheme are described below with reference to FIGS. 23-26C.

FIG. 18 illustrates the processor core machine state with partition adjunct 1610 dispatched active. In this example, the adjunct service provided by partition adjunct 1610 employs general purpose registers 1710, but not floating point registers 1720 and vector registers 1730, which retain the state information for LPAR 1 1600, presently in the inactive state. Further, only selected special purpose registers 1740 are employed by the partition adjunct, with the remaining special purpose registers being invalidated or containing state information for LPAR 1 1600. The special purpose register SDR1 1700 (in this example) continues to point to the virtual address to real address page table 1620 of LPAR 1 since partition adjunct 1610 is mapped into the donated virtual address spaces 1621 thereof. Various entries 1751 in translation lookaside buffer 1750 are being employed with the partition adjunct dispatched, and the remaining entries retain state information of LPAR 1. A single entry 1761 in segment lookaside buffer 1760 is installed to cover the adjunct's portion of the address space, with the remaining entries retaining the state information for LPAR 1, which is protected from access by LPAR 1. Because of the protection keys employed, for example, by special purpose register AMR 1770, the partition adjunct only has access to the noted registers and table entries. From a hypervisor standpoint, dispatching of the partition adjunct is separate from dispatching of the LPAR 1, however, the processor core machine state information is held for LPAR 1 in various registers and tables not employed by the partition adjunct. The result is that the context switch from LPAR 1 to the partition adjunct is a "light" context switch of the state machine wherein only selected registers and table information is updated with the partition adjunct state information. Similarly, when switching from the partition adjunct back to LPAR 1, only the register information employed by the partition adjunct needs to be updated for translation back to LPAR 1 active state.

FIGS. 19-22 illustrate one example of context switching the current state machine between a logical partition and a partition adjunct, such as described herein, in a data processing system employing simultaneous hardware multithreading. The example depicted is a two hardware-threaded core. However, those skilled in the art will understand that the concepts described are readily applicable to more than a two hardware-threaded core. By way of example, the POWER5™ and POWER6™ Power Instruction Set Architecture Processors, offered by International Business Machines Corporation, of Armonk, N.Y., employ two hardware-threaded cores.

Figure 19:
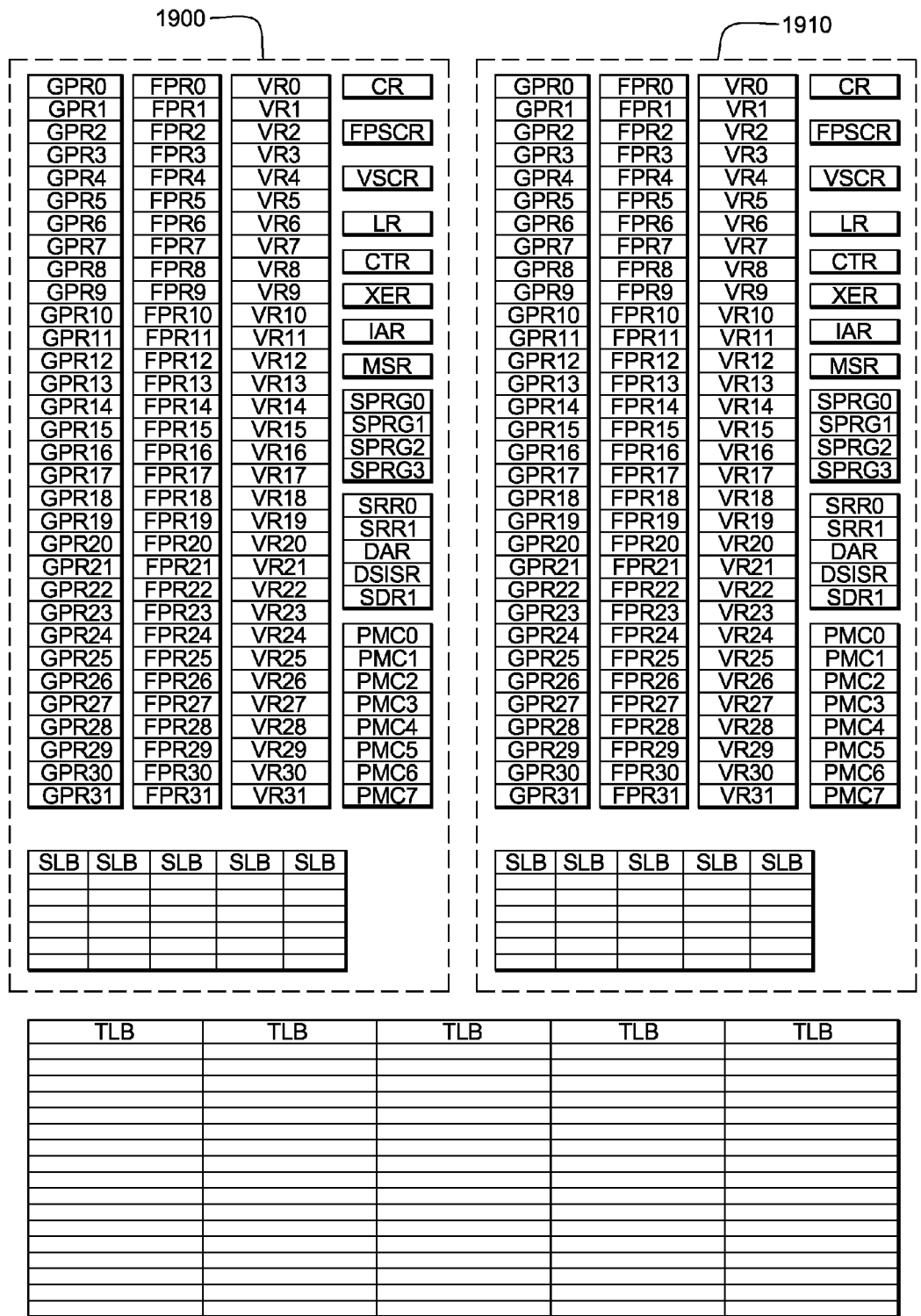
FIG. 19 illustrates processor register machine state and memory management and address translation hardware for a multithreaded processor core of a data processing system.
Figure 20:
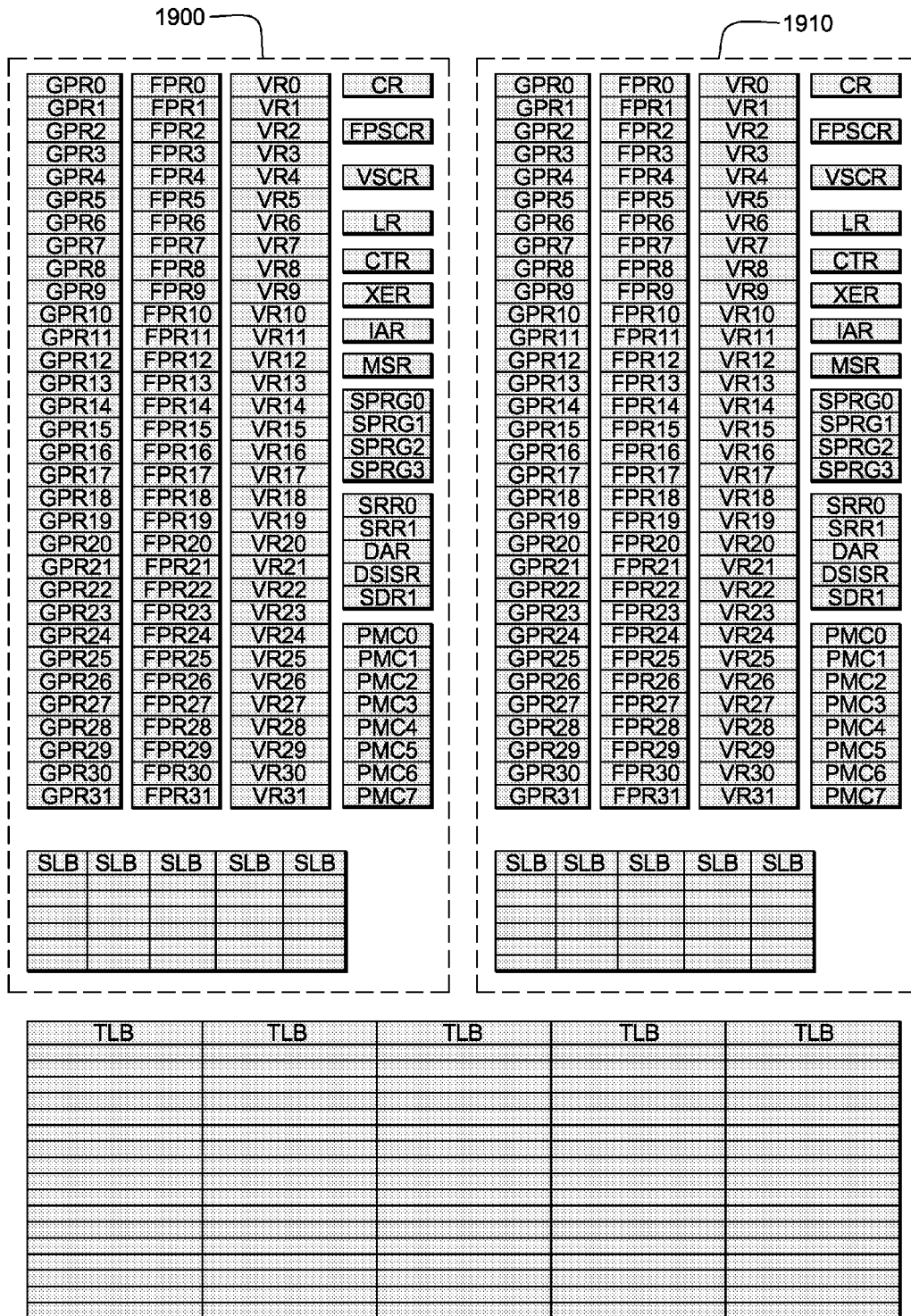
FIG. 20 illustrates the processor register machine state and memory management and address translation hardware of FIG. 19, with a first logical partition (LPAR 1) in the active state.

As illustrated in FIG. 19, the multithreaded core includes a first hardware thread 1900 and a second hardware thread 1910 which share a translation lookaside buffer 1920. Each hardware thread includes, for example, the general purpose registers, floating point registers, and special purpose registers, as well as the segment lookaside buffer described above in connection with FIGS. 13-18. In FIG. 19, the multithreaded hardware core is illustrated without a logical partition being active. In FIG. 20, a first logical partition (LPAR 1) is assumed to be active, with the LPAR 1 state information occupying the hardware-threaded cores 1900, 1910, as well as the table lookaside buffer 1920.

Figure 21:
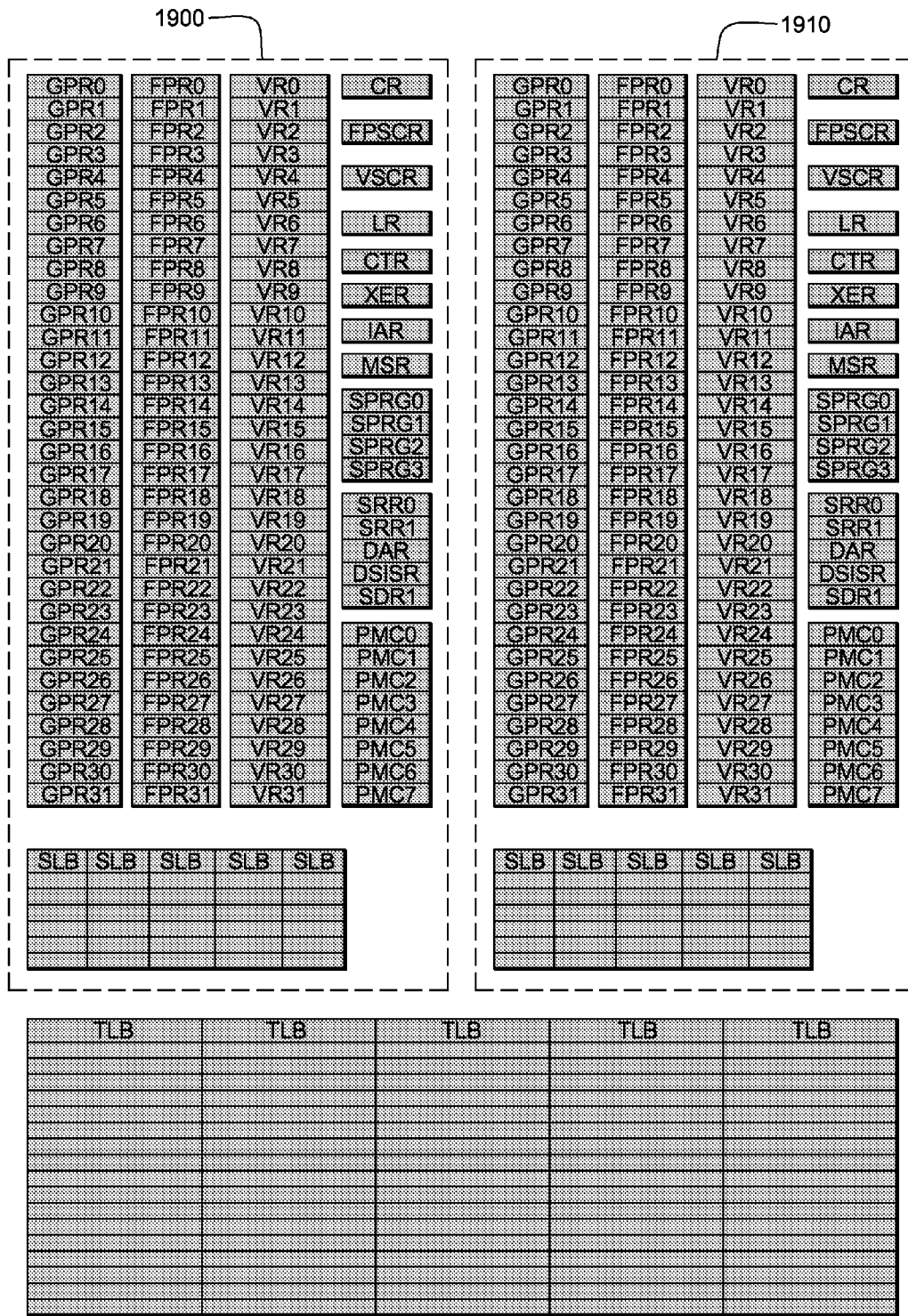
FIG. 21 illustrates the processor register machine state and memory management and address translation hardware of FIGS. 19 & 20 after context switching the current state machine to state data of a second logical partition (LPAR 2) from LPAR 1.

In FIG. 21, a context switch of the state machine has occurred between the first logical partition (LPAR 1) and a second logical partition (LPAR 2). As illustrated, this is a full context switch, wherein LPAR 2's machine state occupies first hardware-threaded core 1900, second hardware-threaded core 1910, and table lookaside buffer 1920 of this two hardware-threaded core example.

Figure 22:
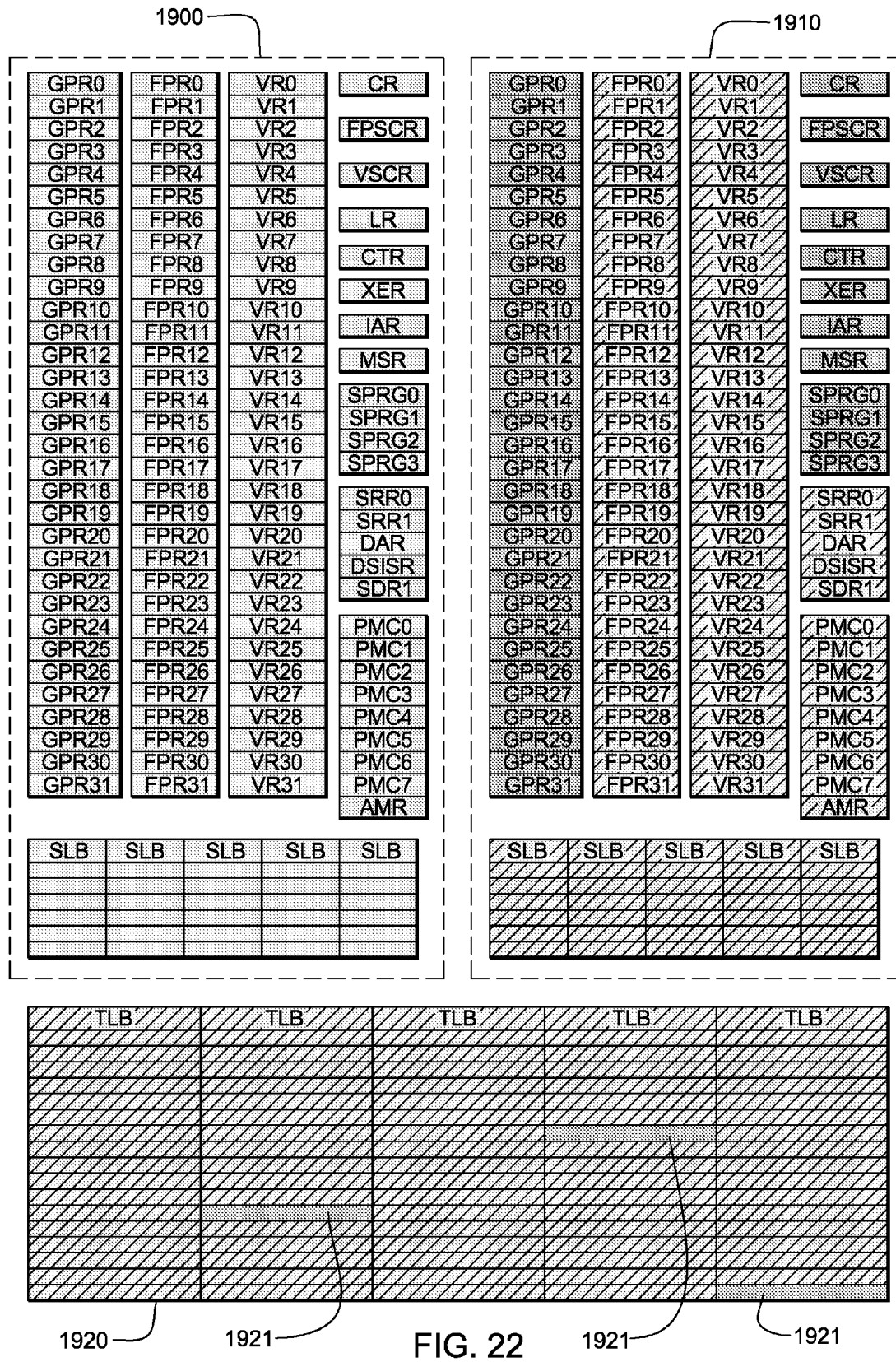
FIG. 22 illustrates the processor register machine state and memory management and address translation hardware of FIG. 19, with partial context switching of the current state machine of one hardware thread from a first logical partition (LPAR 1) to the partition adjunct, in accordance with an aspect of the present invention.

FIG. 22 illustrates an example of context switching from LPAR 1 to a partition adjunct initiated by LPAR 1. As illustrated, only a single thread 1910 is updated with partition adjunct's state information, i.e., undergoes a light context switch. Specifically, the general purpose registers and various special purpose registers are employed in this example by the partition adjunct service, with the remaining registers and the segment lookaside buffer retaining machine state information of the logical partition (LPAR 1). Further, the second thread, that is, hardware thread 1900, retains and remains running in the initiating logical partition (i.e., LPAR 1). In this example, the machine state for LPAR 1 is also retained by the table lookaside buffer, with only selected entries 1921 being employed by the partition adjunct. Each hardware thread has its own access mask register that contains a set of keys which control what hardware the partition adjunct (when active on that thread) has access to. Thus, LPAR 1 remains active on one thread, while the partition adjunct is active on a different thread of the multithreaded data processing system.

In a further aspect, processor-level control and isolation features and procedures are described below with reference to FIGS. 23-26C. These features and procedures facilitate hypervisor enforcement of isolation between entities sharing a single logical partition's virtual address space. In one example, the entities are the single logical partition itself, and a partition adjunct such as described herein.

Figure 23:
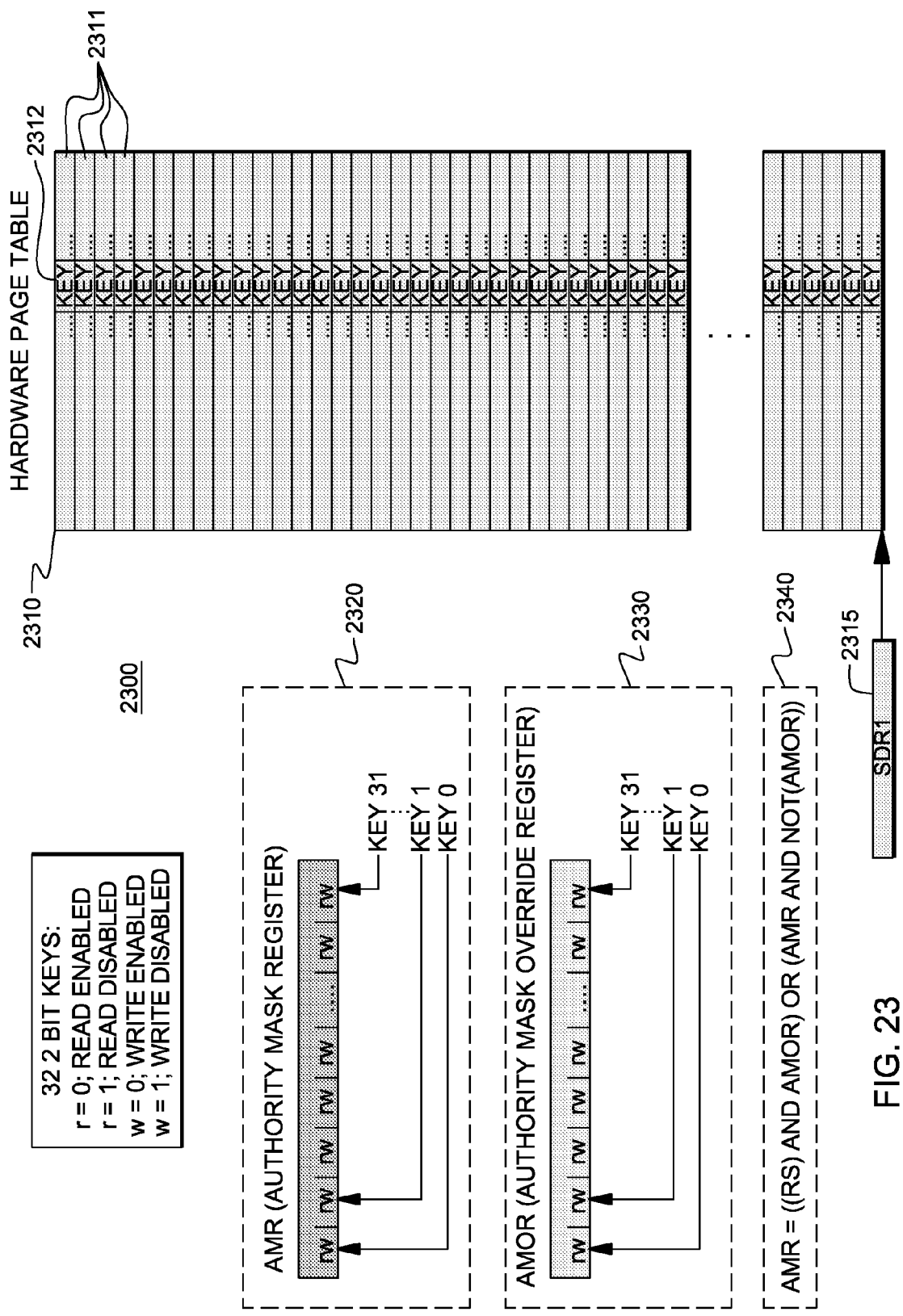
FIG. 23 illustrates another example of selected memory management hardware of a data processing system, including a hardware page table, an authority mask register (AMR), an authority mask override register (AMOR), and a logic control, in accordance with an aspect of the present invention.

FIG. 23 illustrates one embodiment of selected memory management unit hardware of a processor, in accordance with an aspect of the present invention. As illustrated, this processor hardware 2300 includes a hardware page table 2310 to hold a virtual address to real address page table. Hardware page table 2310 includes multiple page table entries 2311, each of which includes a memory protection key 2312 as a portion of the page table entry. As one example, each memory protection key is a 5 bit index to one of 32 two-bit access controls within a 64-bit authority mask register (AMR) 2320. Special purpose register SDR1 2315 points to a base address of the hardware page table currently being employed in processing.

State data of an entity being dispatched is installed by the hypervisor in the process registers. This state data includes key values (rw) in AMR 2320 for each memory protection key 2312 employed in the hardware page table 2310. In one example, each key value is a two-bit read/write value in AMR 2320, which as noted is a processor hardware level register. One bit of the two-bit key is a read (r) enable/disable bit, and the other bit is a write (w) enable/disable bit. In this example, an r=0 means that a read operation is enabled for the virtual address space protected by the associated memory protection key, while r=1 means that the read operation is disabled. Similarly, a w=0 means that a write operation is enabled for the associated virtual address space, while a w=1 means that the write operation is disabled. Conventionally, the logical partition operating system runs in supervisor mode, meaning that it has access to and can modify key values in the authority mask register.

By way of specific example, the POWER6™ Power Instruction Set Architecture Processor, offered by International Business Machines Corporation, of Armonk, N.Y., employs hardware page table 2310 and authority mask register 2320 structures such as set forth in FIG. 23. Each memory protection key is assigned a policy (i.e., a respective key value) in the AMR that prohibits (or allows) virtual address spaced mapped by page table entries tagged with that particular memory protection key from being written to and/or read. Changing a key value in the authority mask register 2320 thus alters the permissions to all virtual address storage that is accessed via the set of page table entries tagged with the associated 5 bit memory protection key.

To facilitate isolation between a logical partition and its partition adjunct, described below is a new hypervisor controlled register (i.e., authority mask override register 2330), which in combination with new hardware control logic 2340, provides the hypervisor with the ability to prohibit an operating system from altering one or more key values in the authority mask register 2320 associated with one or more memory protection keys employed in the hardware page table to protect virtual address space of, for example, the partition adjunct.

Conceptually, memory translations or page table entries in hardware page table 2310 are classified (in accordance with an aspect of the present invention) as being owned by an operating system (i.e., of a logical partition) or owned by a partition adjunct, via a hypervisor controlled mechanism. The hypervisor can toggle which class of translations or entries is active (i.e., has permissions or key values that permit a read and/or write to the associated virtual address space), and in doing so, run either the logical partition's operating system or the partition adjunct in a manner that provides full isolation to both, within the same memory management unit context.

Memory translations (or page table entries) are classified by memory protection keys, and the concepts presented herein allow for a certain subset of the memory protection keys supported by the processor to be made unmodifiable by the logical partition's operating system. This permits the hypervisor to partition the memory protection key space between the partition adjunct and the logical partition's operating system, disabling all permissions for the memory protection keys corresponding to the entity that is not currently running and simultaneously prohibiting the currently running entity from modifying keys to gain access to memory protected by the disabled memory protection keys.

The hypervisor protection mechanism employs a new processor-level hardware register, referred to herein as the authority mask override register (AMOR) 2330. The AMOR 2330 is identical to the AMR, that is, in this example, is also a 64-bit register, and contains a corresponding two-bit access valve for each memory protection key of the 32 memory protection keys (in one example) employed in the hardware page table and having associated key values in the AMR. By definition, the AMOR is hypervisor-privileged, for both reading and writing. When operational, in addition to installing values into the AMR when dispatching a logical partition or a partition adjunct, the hypervisor installs access values into the AMOR which control whether the currently running entity (i.e., logical partition or partition adjunct) can gain access to particular key values in the AMR for the purpose of modification, and thus, modify the virtual address space which it can access. The locking function includes passing a request to modify one or more key values of the AMR through a processor-level hardware logic control 2340. Contents of the AMR are updated by bitwise ANDing the new key values in a source register (RS) with the access values set by the hypervisor in the AMOR. The values in the source register are, for example, set by an operating system seeking to modify content of the AMR. The result of this bitwise AND is bitwise ORed with the bitwise ANDing of the current contents of the AMR with the inverse of the contents of the AMOR. The result is that the contents of the AMOR control which value(s) of the AMR may be modified by the logical partition's operating system. Those values which are associated with memory protection keys of the partition adjunct are prohibited from being modified by the logic control, as explained further below.

Figure 24:
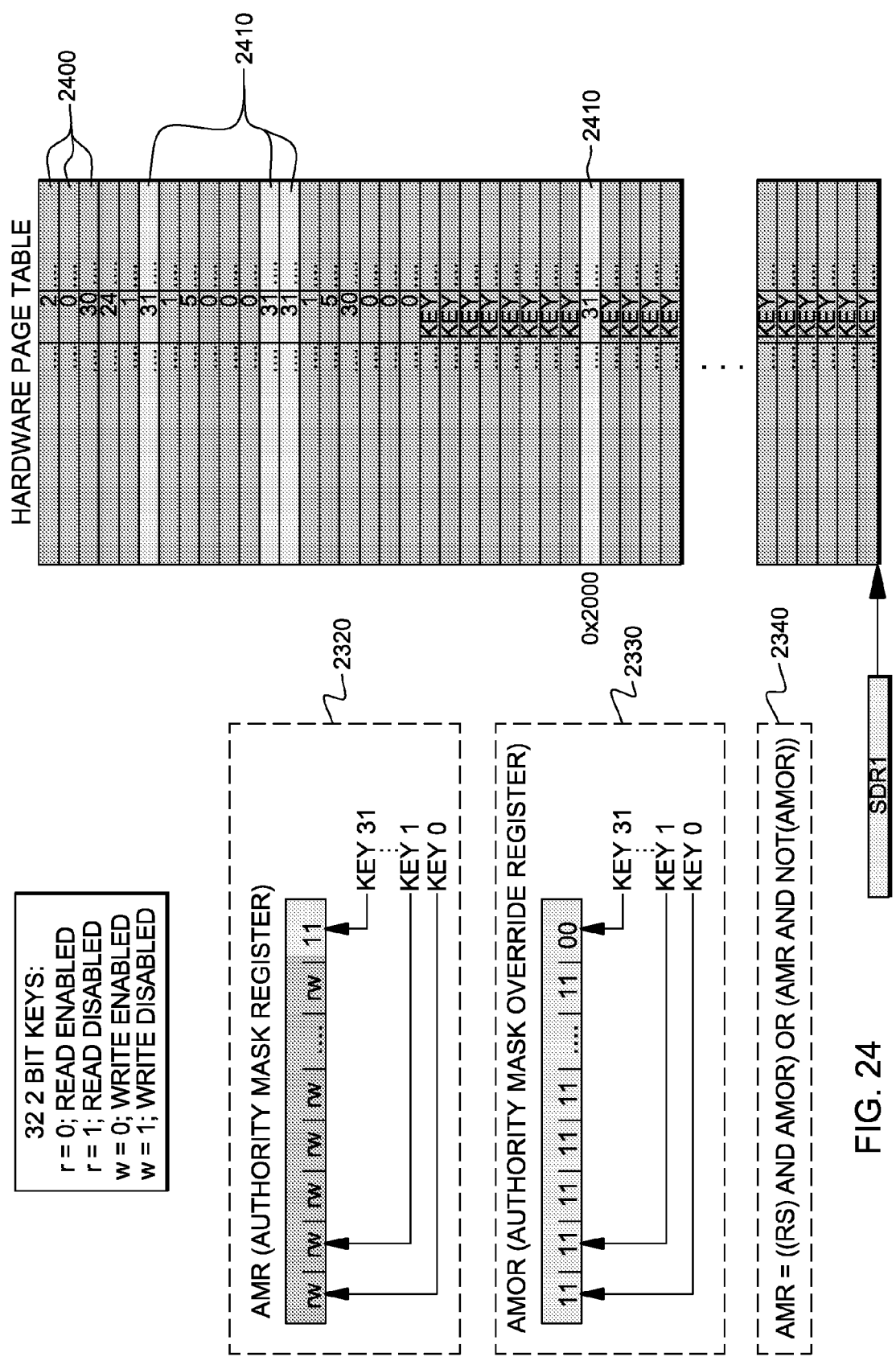
FIG. 24 illustrates exemplary state data for the memory management hardware of FIG. 23 after dispatching of a logical partition by the hypervisor, in accordance with an aspect of the present invention.

In FIG. 24, state values are indicated for a dispatched client partition. The lighter gray shading indicates regions unaccessible by the client partition, and the dark gray regions which are accessible by the client partition. In this example, the client partition has access to virtual address space identified in page table entries 2400, that is, to virtual address space protected by memory protection keys 0-30, and is prohibited from accessing virtual address space identified in page table entries 2410 having memory protection key 31 associated therewith. Memory protection key 31 references a two-bit key value of 11 in the AMR, meaning that the client partition can neither read or write virtual address space mapped by those page table entries having memory protection key 31.

By way of example, if a client partition (i.e., the single logical partition whose virtual address space is shared) attempts to reference virtual address space 0x2000, then memory protection key 31 is identified from the corresponding page table entry 2410, and the key value of this memory protection key is checked in the AMR 2320. Since the key value is 11, read and write operations are disabled, and access is denied to the client partition.

If the client partition attempts to set AMR key 31 to a key value of 00 (to grant access to itself to the corresponding virtual address space) then the request is passed through control logic 2340, which results in:

$$mtspr \quad AMR, 0$$
$$AMR = ((RS) \text{ AND } AMOR) \text{ OR } (AMR \text{ AND NOT } (AMOR))$$
$$= ((0 \times 0 \text{ AND } 0 \times FFFFFFFFFFFFFFFC \text{ OR}$$
$$0 \times 0000000000000003 \text{ AND } 0 \times 0000000000000003)$$
$$= (0) \text{ OR } 0 \times 0000000000000003$$
$$= 0 \times 0000000000000003$$

Therefore, the client partition cannot modify the key value for Key 31.

Figure 25:
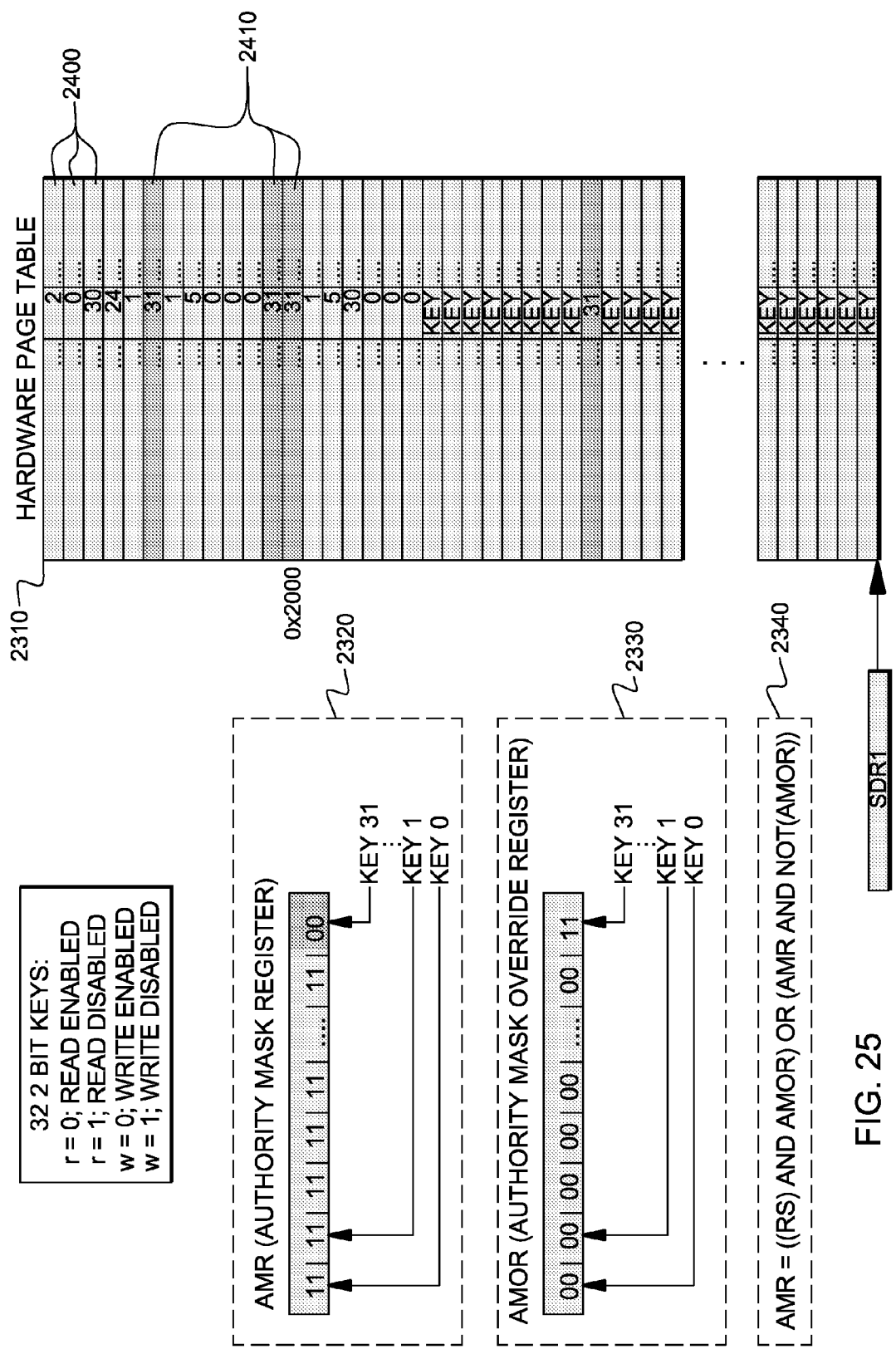
FIG. 25 illustrates exemplary state data for the memory management hardware of FIG. 23, after context switching the state machine to a partition adjunct, in accordance with an aspect of the present invention.

FIG. 25 again illustrates processor-level hardware comprising hardware page table 2310, AMR 2320, AMOR 2330 and control logic 2340. In this example, state values are indicated for a dispatched partition adjunct, for example, resulting from a context switch from the client partition state data illustrated in FIG. 24. In FIG. 25, lighter gray shading indicates regions unaccessible to the partition adjunct and dark gray indicates regions accessible by the partition adjunct. Thus, the partition adjunct has access to virtual address space identified in page table entries 2410, protected by memory protection key 31, but not to virtual address space mapped by page table entries 2400, protected by memory protection keys 0-30. With dispatching of the partition adjunct, the hypervisor loads the key value of 11 into AMR 2320 for memory protection keys 0-30, and loads the value 00 for key 31. Thus, the partition adjunct can only read or write virtual address space identified in page table entries 2410 protected by memory protection key 31.

By way of example, if the partition adjunct attempts to reference virtual address space 0x2000, memory protection key 31 is identified from the corresponding page table entry 2410, and the key value for memory protection key 31 is checked in AMR 2320. Since the key value is 00, read and write operations are enabled for this virtual address space, and the partition adjunct is granted access.

If the partition adjunct attempts to reference any other virtual address space without memory protection key 31, that is any page table entry 2400 with a memory protection key 0-30, access is denied since the corresponding key value is disabled (i.e., the two-bit key is 11) in AMR 2320.

In one implementation, the partition adjunct is run in problem state, meaning that the partition adjunct cannot attempt to set any key value in AMR 2320 since the AMR register is only controlled or modifiable in supervisor mode (or hypervisor mode). If a supervisor partition adjunct were created with operating system functionality, that is capable of running in supervisor mode, then the partition adjunct might attempt to set any key value in AMR 2320 to 00 to grant itself access to other virtual address space. If this were to occur, then control logic 2340 is employed to prohibit the supervisor partition adjunct from modifying key values associated with memory protection keys 0-30. Specifically:

$$mtspr \quad AMR, 0$$
$$AMR = ((RS) \text{ AND } AMOR) \text{ OR } (AMR \text{ AND NOT } (AMOR))$$
$$= ((0 \times 0 \text{ AND } 0 \times 0000000000000003 \text{ OR}$$
$$0 \times FFFFFFFFFFFFFFC0 \times FFFFFFFFFFFFFFFC$$
$$= (0) \text{ OR } (0 \times FFFFFFFFFFFFFFFC)$$
$$= 0 \times FFFFFFFFFFFFFFFC$$

Thus the "supervisor" partition adjunct cannot enable or modify any key value other than the key value of memory protection key 31.

Figure 26A:
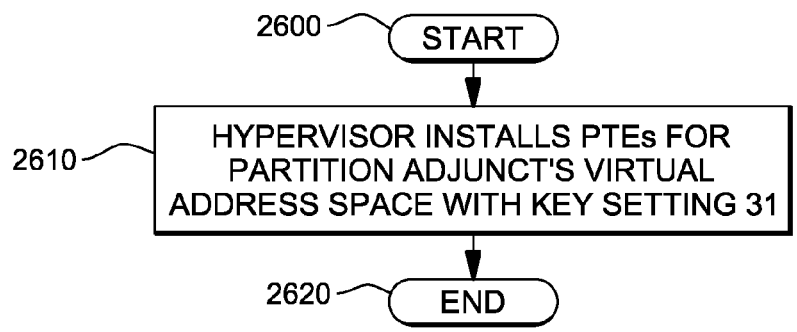
FIG. 26A is a flowchart of one process embodiment of a hypervisor installing page table entries for a partition adjunct's virtual address space, in accordance with an aspect of the present invention.

FIG. 26A depicts a process for initial virtual address donation or setup performed by the hypervisor. The process begins 2600 with the hypervisor installing page table entries, for example, for a partition adjunct's virtual address space with (in one example) a memory protection key 31 2610, which completes the hypervisor virtual address donation setup 2620.

Figure 26B:
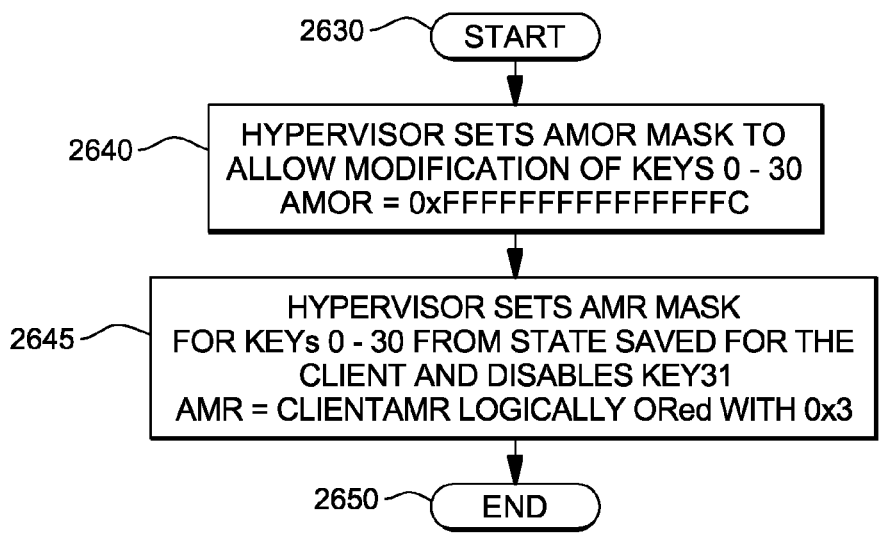
FIG. 26B is a flowchart of one process embodiment of a hypervisor setting access values within the authority mask override register to enable logical partition modification of key values of selected memory protection keys, and disable logical partition modification of one or more key values of one or more memory protection keys, in accordance with an aspect of the present invention.

In FIG. 26B, the hypervisor dispatches a client partition context. The hypervisor begins 2630 by setting the AMOR mask (i.e., access values in the AMOR) to allow for modification of memory protection keys 0-30 2640. The hypervisor then sets the AMR mask (i.e., key values in the AMR) for memory protection keys 0-30 from the state data saved for the client partition and disables the key values for memory protection key 31 2645, which completes the processing 2650.

Figure 26C:
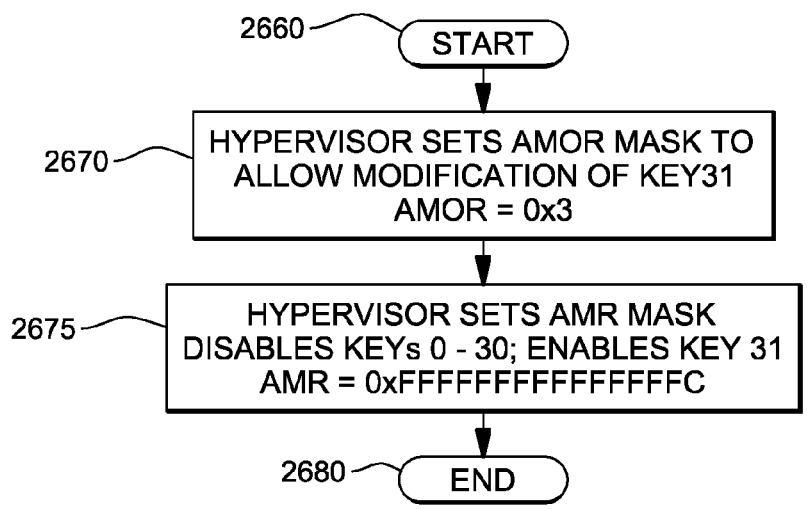
FIG. 26C is a flowchart of one process embodiment of a hypervisor setting access values in the authority mask override register to allow (in one embodiment) partition adjunct modification of key values of the associated memory protection key, and disabling partition adjunct modification of key values of memory protection keys associated with the logical partition, in accordance with an aspect of the present invention.

In FIG. 26C, the hypervisor dispatches a partition adjunct context, with again the assumption being that memory protection key 31 is reserved for the partition adjunct. Processing begins 2660 with the hypervisor setting the AMOR mask (i.e., access values) to allow for modification of key values for memory protection key 31 only 2670. The hypervisor then sets the AMR mask (i.e., key values) to disable memory protection keys 0-30 and enable memory protection key 31 2675, which completes processing 2680.

The above-memory protection protocol is implemented in the flowcharts of FIGS. 6-11, described above at a number of steps. For example, in the flowchart of FIG. 6, the hypervisor sets up hardware protection/enforcement of the donated virtual address space 630, which includes setting the access values for the AMOR, as well as the key values for the AMR, and subsequently, the hypervisor initializes the partition adjunct (in the example of FIG. 6), which includes installing the previously setup access values and key values for the partition adjunct into the AMOR and AMR. Similar processing steps are implemented in the flowcharts of FIGS. 7 & 8. In FIG. 9, the hypervisor sets up the hardware protection/enforcement of the donated virtual address space for the client partition (in the example of FIG. 9) at 935. In FIGS. 10 & 11, the hypervisor would similarly set up and install the necessary values of the AMOR and AMR whenever there is a context switch to the client partition or to the partition adjunct.

To summarize, in accordance with the above-described protocol, the hypervisor mediates or otherwise approves of the instantiation of all memory translations by the partition adjunct or client partition, and in performing these functions is able to control the memory protection keys that are associated with each translation, thus prohibiting (for example) a client partition operating system from creating a page table entry that uses a partition adjunct (or hypervisor) owned memory protection key. The hypervisor applies a hypervisor-owned memory protection key to all page table entries used by a partition adjunct. When the client partition's operating system runs, the memory protection keys associated with partition adjunct's entries prohibit all access, and the control/locking protocol described above provides a means for the hypervisor to insure that the operating system may not modify the permissions (i.e., key values) associated with a particular memory protection key assigned to the partition adjunct. When the partition adjunct runs, the memory protection keys are reprogrammed by the hypervisor to permit access to the partition adjunct-related virtual address space and disable access to all other virtual address space. Those skilled in the art should note that the 64-bit AMR and AMOR registers described herein are provided by way of example only. The purpose of the AMOR, in combination with the control logic, is to allow the hypervisor to prevent the client partition's operating system for modifying selected mask bits in the AMR. In the example described, the AMOR and control logic are processor-level hardware implemented.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 27:
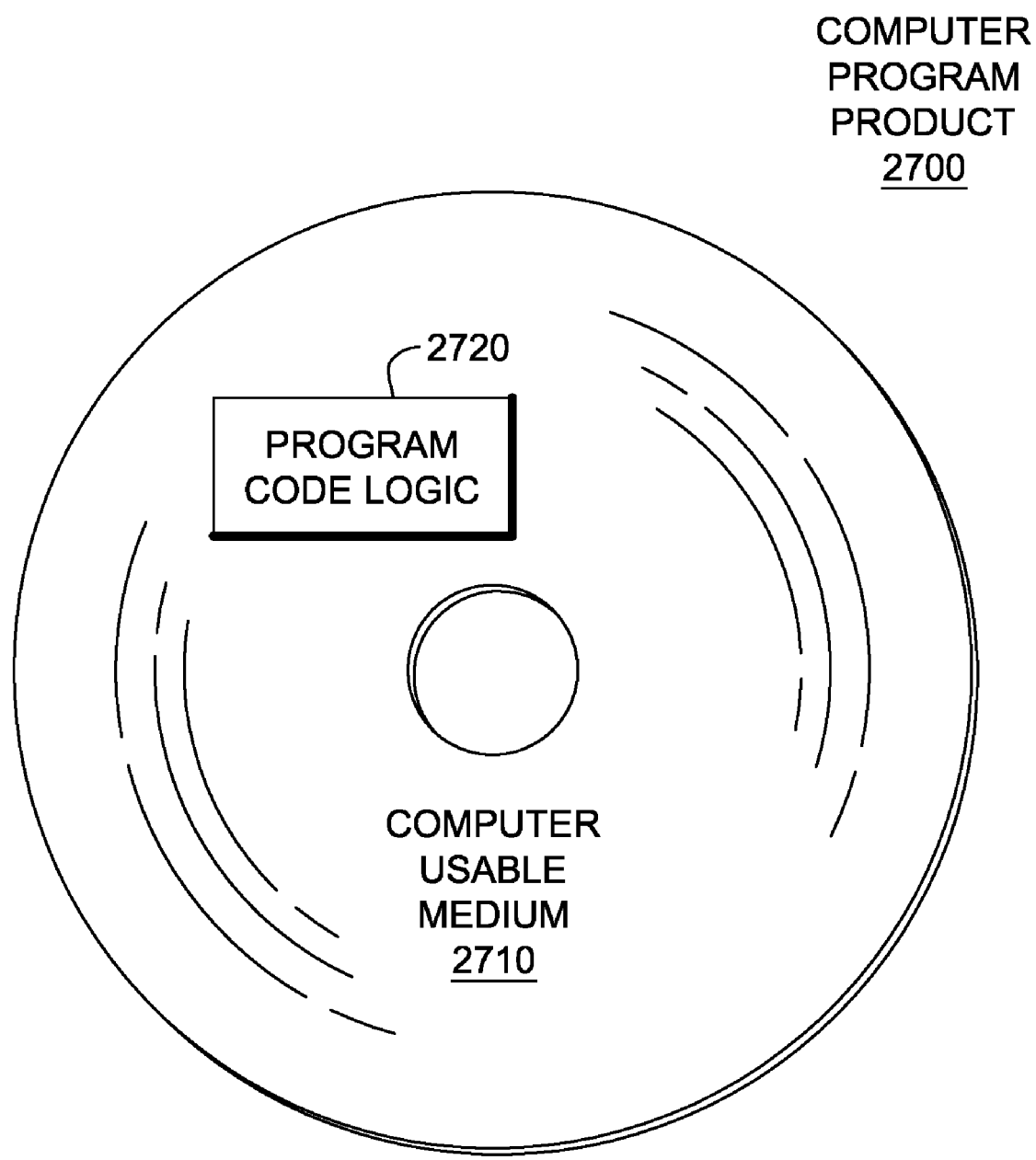
FIG. 27 depicts one embodiment of a computer program product incorporating one or more aspects of the present invention.

One example of an article of manufacture or a computer program product incorporating one or more aspects of the present invention is described with reference to FIG. 27. A computer program product 2700 includes, for instance, one or more computer usable media 2710 to store computer readable program code means or logic 2720 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of controlling access to shared virtual address space within a data processing system, the method comprising:
   associating, by a hypervisor of the data processing system, a memory protection key with a portion of a single logical partition's defined virtual address space, and allowing the single logical partition's defined virtual address space to be shared by multiple partitions of the data processing system, the memory protection key preventing access by a first partition of the multiple partitions to the portion of the single logical partition's virtual address space, and allowing access by a second partition of the multiple partitions to the portion of the single logical partition's virtual address space; and
   locking by the hypervisor the memory protection key from modification by the first partition of the multiple partitions sharing the single logical partition's virtual address space, wherein the locking prevents the first partition from modifying the memory protection key and thereby gaining access to the portion of the single logical partition's defined virtual address space with the associated memory protection key.

2. The method of claim 1, wherein the associating comprises installing by the hypervisor a key value for the memory protection key in an authority mask register of memory management and address translation hardware of the data processing system, the installing being performed with dispatching of the first partition or the second partition of the multiple partitions sharing the single logical partition's virtual address space, wherein the key value allows access by the second partition of the multiple partitions to the portion of the single logical partition's virtual address space, and denies access by the first partition of the multiple partitions to the portion of the single logical partition's virtual address space.

3. The method of claim 2, wherein the memory protection key is one memory protection key of a plurality of memory protection keys whose key values are installed by the hypervisor in the authority mask register with dispatching of the first partition or the second partition of the multiple partitions sharing the single logical partition's virtual address space, and wherein the locking comprises employing an authority mask override register to lock the key value of the one memory protection key in the authority mask register from modification by the first partition of the multiple partitions sharing the single logical partition's virtual address space, wherein the first partition is allowed by the authority mask override register to modify at least one other key value in the authority mask register of at least one other memory protection key of the plurality of memory protection keys.

4. The method of claim 3, wherein the locking further comprises employing hypervisor installed access values in the authority mask override register to allow the first partition to modify, or prevent the first partition from modifying, selected key values in the authority mask register, wherein only the hypervisor has authority to modify access values in the authority mask override register.

5. The method of claim 4, wherein the locking further comprises preventing the first partition from modifying one or more key values in the authority mask register employing the following control logic responsive to a modify key value request of the first partition:

AMR=((RS)AND AMOR)OR(AMR AND NOT(A-MOR));

wherein:
AMR=key values in the authority mask register;
RS=values in a source register to be written into the authority mask register by the first partition;
AND=a bitwise AND function;
AMOR=access values in the authority mask override register set by the hypervisor;
OR=a bitwise OR function;
NOT (AMOR)=inverse of the access values in the AMOR register.

6. The method of claim 5, wherein the logic control is implemented in hardware of the data processing system, and the first partition is the single logical partition, and the second partition is a partition adjunct sharing the defined virtual address space of the single logical partition.

7. The method of claim 1, wherein the single logical partition's defined virtual address space is referenced in a virtual address to real address page table of the single logical partition, the virtual address to real address page table comprising a plurality of page table entries, at least one page table entry comprising one memory protection key and identifying the portion of the single logical partition's virtual address space employed by the second partition of the multiple partitions sharing the single logical partition's virtual address space, and wherein multiple other page table entries of the virtual address to real address page table comprise different memory protection keys, the different memory protection keys having key values associated therewith set forth in an authority mask register, the key values of the different memory protection keys being modifiable by the first partition of the multiple partitions when the first partition is dispatched by the hypervisor and wherein the locking comprises preventing the first partition when dispatched from modifying a key value in the authority mask register for the memory protection key associated with the single logical partition's virtual address space employed by the second partition of the multiple partitions.

8. The method of claim 1, wherein the first partition is the single logical partition, and the second partition is a partition adjunct sharing virtual address space of the single logical partition donated to the partition adjunct by the single logical partition.

9. A method of protecting memory employed by a partition adjunct, the method comprising:
   instantiating by a hypervisor a partition adjunct within a data processing system employing virtual address space donated to the partition adjunct by a logical partition of the data processing system, and wherein the instantiating includes associating a memory protection key with the donated virtual address space of the logical partition which allows access to the donated virtual address space by the partition adjunct and prevents access to the donated virtual address space by the logical partition, wherein the logical partition and the partition adjunct share the logical partition's defined virtual address space; and locking by the hypervisor the memory protection key from being modified by the logical partition.

10. The method of claim 9, wherein the memory protection key is one memory protection key of a plurality of memory protection keys whose key values are installed by the hypervisor in the authority mask register with dispatching of the logical partition or the partition adjunct, and wherein the locking comprises employing an authority mask override register to lock a key value of the one memory protection key in the authority mask register from modification by the logical partition when dispatched, wherein the hypervisor installs access values into the authority mask override register with dispatching of the logical partition or dispatching of the partition adjunct.

11. The method of claim 10, wherein the locking further comprises preventing the logical partition from modifying one or more key values in the authority mask register employing the following control logic responsive to a modify key value request of the logical partition:

AMR=((RS)AND AMOR)OR(AMR AND NOT (AMOR));

wherein:
AMR=key values in the authority mask register;
RS=values in a source register to he written into the authority mask register by the logical partition;
AND=a bitwise AND function;
AMOR=access values in the authority mask override register set by the hypervisor;
OR=a bitwise OR function;
NOT (AMOR)=inverse of the access values in the AMOR register.

12. A data processing, system comprising:
a memory; and
a processor in communications with the memory, wherein the data processing system is configured to:
associate, by a hypervisor of the data processing system, a memory protection key with a portion of a single logical partition's defined virtual address space, and allow the single logical partition's defined virtual address space to be shared by multiple partitions of the data processing system, the memory protection key preventing access by a first partition of the multiple partitions to the portion of the single logical partition's virtual address space, and allowing access by a second partition of the multiple partitions to the portion of the single logical partition's virtual address space; and
lock by the hypervisor the memory protection key from modification by the first partition of the multiple partitions sharing the single logical partition's virtual address space, wherein the locking prevents the first partition from modifying the memory protection key and thereby gaining access to the portion of the single logical partition's defined virtual address space with the associated memory protection key.

13. The data processing system of claim 12, wherein the hypervisor installs a key value for the memory protection key in an authority mask register of memory management and address translation hardware of the data processing system, the installing being performed with dispatching of the first partition or the second partition of the multiple partitions sharing the single logical partition's virtual address space, wherein the key value allows access by the second partition of the multiple partitions to the portion of the single logical partition's virtual address space, and denies access by the first partition of the multiple partitions to the portion of the single logical partition's virtual address space.

14. The data processing system of claim 13, wherein the memory protection key is one memory protection key of a plurality of memory protection keys whose key values are installed by the hypervisor in the authority mask register with dispatching of the first partition or the second partition of the multiple partitions sharing the single logical partition's virtual address space, and wherein the locking mechanism comprises an authority mask override register to lock the key value of the one memory protection key in the authority mask register from modification by the first partition of the multiple entities partitions sharing the single logical partitions virtual address space, wherein the first partition is allowed by the authority mask override register to modify at least one other key value of the authority mask register of at least one other memory protection key of the plurality of memory protection keys.

15. The data processing system of claim 14, wherein the locking comprises employing hypervisor installed access values in the authority mask override register, the access values allowing the first partition to modify, or preventing the first partition from modifying, selected key values in the authority mask register, wherein only the hypervisor has authority to modify access values in the authority mask override register.

16. The data processing system of claim 15, further comprising hardware logic control for the data processing system, wherein a modify key value request of the first partition is processed by the hardware logic control to determine whether the first partition is allowed to modify one or more key values in the authority mask register, the control logic comprising:

AMR=((RS)AND AMOR)OR(AMR AND NOT (AMR));

wherein:
AMR=key values in the authority mask register;
RS=values in a source register to be written into the authority mask register by the first partition;
AND=a bitwise AND function;
AMOR=access values in the authority mask override register set by the hypervisor;
OR=a bitwise OR function;
NOT (AMOR)=inverse of the access values in the AMOR register.

17. An article of manufacture comprising:
at least one non-transient computer-usable medium having computer-readable program code logic to define a method of controlling access to shared virtual address space within a data processing system, the computer-readable program code logic when executing on a processor performing:
associating, by a hypervisor of the data processing system, a memory protection key with a portion of a single logical partition's defined virtual address space, and allowing the single logical partition's defined virtual address space to be shared by multiple partitions of the data processing system, the memory protection key preventing access by a first partition of the multiple partitions to the portion of the single logical partition's virtual address space, and allowing access by a second partition of the multiple partitions to the portion of the single logical partition's virtual address space; and
locking by the hypervisor the memory protection key from modification by the first partition of the multiple partitions sharing the single logical partition's virtual address space, wherein the locking prevents the first partition from modifying the memory protection key and thereby gaining access to the portion of the single logical partition's defined virtual address space with the associated memory protection key.

18. The article of manufacture of claim 17, wherein the associating comprises installing by the hypervisor a key value for the memory protection key in an authority mask register of memory management and address translation hardware of the data processing system, the installing being performed with dispatching of the first partition or the second partition of the multiple partitions sharing the single logical partition's virtual address space, wherein the key value allows access by the second partition of the multiple partitions to the portion of the single logical partition's virtual address space, and denies access by the first partition of the multiple partitions to the portion of the single logical partition's virtual address space.

19. The article of manufacture of claim 18, wherein the memory protection key is one memory protection key of a plurality of memory protection keys whose key values are installed by the hypervisor in the authority mask register with dispatching of the first partition or the second partition of the multiple partitions sharing the single logical partition's virtual address space, and wherein the locking comprises employing an authority mask override register to lock the key value of the one memory protection key in the authority mask register from modification by the first partition of the multiple partitions sharing the single logical partition's virtual address space, wherein the first partition is allowed by the authority mask override register to modify at least one other key value in the authority mask register of at least one other memory protection key of the plurality of memory protection keys.

20. The article of manufacture of claim 19, wherein the locking further comprises employing hypervisor installed access values in the authority mask override register to allow the first partition to modify, or prevent the first partition from modifying, selected key values in the authority mask register, wherein only the hypervisor has authority to modify access values in the authority mask override register.

21. The article of manufacture of claim 20, wherein the locking further comprises preventing the first partition from modifying one or more key values in the authority mask register employing the following logic control responsive to a modify key value request of the one first partition:

$$AMR = ((RS) \text{ AND } AMOR) \text{ OR } (AMR \text{ AND NOT}(AMOR));$$

wherein:
- AMR=key values in the authority mask register;
- RS=values in a source register to be written into the authority mask register by the first partition;
- AND=a bitwise AND function;
- AMOR=access values in the authority mask override register set by the hypervisor;
- OR=a bitwise OR function;
- NOT (AMOR)=inverse of the access values in the AMOR register.

* * * * *